(12) United States Patent
Popplewell et al.

(10) Patent No.: US 12,030,326 B2
(45) Date of Patent: Jul. 9, 2024

(54) SYSTEM AND METHOD FOR PRINTING AND DRYING FLAVORS AND FRAGRANCES

(71) Applicant: INTERNATIONAL FLAVORS & FRAGRANCES INC., New York, NY (US)

(72) Inventors: Lewis Michael Popplewell, Union Beach, NJ (US); Christopher Thomas Lavallee, Union Beach, NJ (US)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 262 days.

(21) Appl. No.: 17/050,025

(22) PCT Filed: Apr. 26, 2019

(86) PCT No.: PCT/US2019/029371
§ 371 (c)(1),
(2) Date: Oct. 23, 2020

(87) PCT Pub. No.: WO2019/212896
PCT Pub. Date: Nov. 7, 2019

(65) Prior Publication Data
US 2021/0086525 A1    Mar. 25, 2021

Related U.S. Application Data

(60) Provisional application No. 62/665,206, filed on May 1, 2018.

(51) Int. Cl.
*B41J 3/407*    (2006.01)
*A23L 27/00*    (2016.01)
(Continued)

(52) U.S. Cl.
CPC ........... *B41J 3/407* (2013.01); *A23L 27/72* (2016.08); *B41J 2/175* (2013.01); *B41J 11/0022* (2021.01);
(Continued)

(58) Field of Classification Search
CPC ......... A23L 27/70; A23L 27/00; B41J 3/407; B41M 3/006; B41M 3/00; C09D 11/38; C11D 3/50; A61K 8/11; B01J 2/02
See application file for complete search history.

(56) References Cited

U.S. PATENT DOCUMENTS 3,208,101 A * 9/1965 Kaiser ............... C22B 1/14
264/13
3,737,328 A * 6/1973 Schumann ........... A23G 3/0257
426/515

(Continued)

FOREIGN PATENT DOCUMENTS

CN    102212419 A    10/2011
GB    1044234 A     9/1966
(Continued)

OTHER PUBLICATIONS

International Preliminary Report on Patentability in PCT/US2019/029371 dated Nov. 3, 2020.
(Continued)

*Primary Examiner* — John Zimmermann

(57) ABSTRACT

A system and method for printing and drying flavors and fragrances is provided. The system and method include a source of flavor or fragrance, a print assembly adapted to print the flavor or fragrance, a movable product conveyor that directly receives the printed flavor or fragrance and a drying component. As the movable product conveyor passes (Continued)

through or adjacent to the drying component, the printed flavor or fragrance is dried thereby providing a free-flowing flavor or fragrance product.

33 Claims, 3 Drawing Sheets

(51) Int. Cl.
    *B41J 2/175*     (2006.01)
    *B41J 11/00*     (2006.01)
    *B41M 3/00*     (2006.01)
    *C09D 11/03*     (2014.01)
    *C09D 11/38*     (2014.01)
    *F26B 17/02*     (2006.01)

(52) U.S. Cl.
    CPC ............ *B41M 3/006* (2013.01); *C09D 11/03* (2013.01); *C09D 11/38* (2013.01); *F26B 17/023* (2013.01)

(56) References Cited

U.S. PATENT DOCUMENTS

| | | | |
|---|---|---|---|
| 3,888,689 | A | 6/1975 | Maekawa |
| 4,578,021 | A * | 3/1986 | Schermutzki ............ B01J 2/26 425/456 |
| 4,946,624 | A * | 8/1990 | Michael ............ D06M 13/005 510/516 |
| 5,256,362 | A * | 10/1993 | Goto ............ C07C 323/25 264/13 |
| 9,878,467 | B2 | 1/2018 | Huddleson |
| 2001/0033933 | A1 | 10/2001 | Brown, III |
| 2005/0031769 | A1 * | 2/2005 | Watanabe ............ A23L 27/70 426/640 |
| 2006/0210681 | A1 * | 9/2006 | Churnick ............ A23G 3/343 426/383 |
| 2007/0296758 | A1 | 12/2007 | Miller |
| 2008/0075810 | A1 * | 3/2008 | Wen ............ A23P 20/18 426/87 |
| 2009/0155560 | A1 | 6/2009 | Lefebvre |
| 2011/0146509 | A1 | 6/2011 | Welygan et al. |
| 2015/0284660 | A1 | 10/2015 | Budijono |
| 2015/0321495 | A1 | 11/2015 | Oosterhoof |
| 2015/0374017 | A1 | 12/2015 | Popplewell |
| 2016/0121286 | A1 * | 5/2016 | Sodd ............ B01J 2/20 264/4.1 |
| 2017/0027205 | A1 | 2/2017 | Brodock |
| 2022/0040658 | A1 * | 2/2022 | Sasaki ............ C11D 3/3761 |

FOREIGN PATENT DOCUMENTS

| | | |
|---|---|---|
| WO | 2008035314 A2 | 3/2008 |
| WO | 2011087649 A2 | 7/2011 |
| WO | 2014118265 A1 | 8/2014 |
| WO | 2014120992 A1 | 8/2014 |
| WO | 2017150692 A1 | 9/2017 |

OTHER PUBLICATIONS

International Search Report and Written Opinion in PCT/US2019/029371 dated Jul. 10, 2019.

\* cited by examiner

SYSTEM AND METHOD FOR PRINTING AND DRYING FLAVORS AND FRAGRANCES

The patent application is the national phase under 35 U.S.C. § 371 of PCT International Application No. PCT/US2019/029371, filed Apr. 26, 2019, which claims the benefit of priority from U.S. Provisional Application Ser. No. 62/665,206 filed May 1, 2018, the contents of which are incorporated in their entireties.

BACKGROUND

High intensity flavors and fragrances, which can range from low to high viscosity materials, are often dried to facilitate their use (supply chain considerations, dosing, storage and stability, etc.) Traditionally, drying has been accomplished in one of two ways. The first is vacuum tray drying and the second is conventional spray drying. Both have benefits and limitations.

The largest benefit of vacuum tray drying is that it can be done without a carrier thereby preparing a flavor with a high loading. See U.S. Pat. Nos. 8,137,504, 7,988,819, 8,137,724, 4,588,598, and 4,282,263. Among numerous limitations, vacuum tray drying often requires conditions such as a long time (e.g., 24 hours) and a high temperature (e.g., >290° C.), both of which are detrimental to the quality and authenticity of the flavor. Further, vacuum try drying systems typically require large footprints and fairly long cycle times. In addition, there can be a significant amount of manual labor involved in loading and removing the trays and handling the product.

The largest benefit of spray drying is that it is more cost effective than vacuum tray drying. The process can be carried out in a continuous manner and the amount of manual labor is reduced. A significant limitation of spray drying is that fragrance or flavor loads can be limited given the dust explosion risk associated with spray drying. For encapsulation of volatile flavors the maximum safe limit for spray drying is 25%. For less volatile materials, such as fragrance oils, this load limit may be higher.

Alternative approaches for generating dried preparations of high intensity flavor and fragrances are therefore needed in the art.

SUMMARY OF THE INVENTION

The present invention provides a system and method for printing and drying flavors and fragrances. In accordance with the method of this invention, a flavor or fragrance is printed onto a movable product conveyor that directly receives the printed flavor or fragrance; and the flavor or fragrance is dried on the movable product conveyor to produce a dried product. Similarly, the system of the invention includes a source of flavor or fragrance; a print assembly adapted to print the flavor or fragrance; a drying component; and a movable product conveyor that directly receives the printed flavor or fragrance and is adjacent to the drying component. In some embodiments, the source of flavor or fragrance is a flavor or fragrance in admixture with a carrier and solvent. In other embodiments, the flavor or fragrance is encapsulated in a core-shell microcapsule (e.g., a silica microcapsule or polyacrylate microcapsule) optionally in admixture with a carrier and solvent. In further embodiments, the flavor is a food product or a reaction flavor. In certain embodiments, the flavor or fragrance has a viscosity of more than 500 cP or more than 1000 cP. With reference to the print assembly, said print assembly can include a print head or array of nozzles and optionally be adapted to print the flavor or fragrance in a dot pattern (e.g., arranged to facilitate drying, post-processing, and product quality) and/or print a flavor or fragrance having a viscosity of at least 500 cP or at least 1000 cP. In some embodiments, the movable product conveyor is a non-stick belt. In other embodiments, air supplied to the drying component is at a temperature of less than 100° C. Optional features of the system include, a dehumidifier configured to supply desiccated air to the drying component; a supplemental energy source (e.g. a radiant heat source), for facilitating drying of the printed flavor or fragrance; and/or a product discharge component for removing dried product from the movable product conveyor.

DETAILED DESCRIPTION OF THE INVENTION

A system and method for printing and drying flavors and fragrances in discrete, predefined shapes has now been developed. Printing individual shapes allows surface integrity to be maintained thereby retaining stability and controlled release of the flavor or fragrance. Moreover, printing allows wider formulation flexibility due to the ability to handle high-viscosity emulsions or suspensions. In particular, printing precise sized particles greater than 425 microns can avoid dust explosion hazards thereby allowing for increased flavor and fragrance loading. Moreover, because the present system is not hindered by the viscosity constraints typically associated with atomization, feed solids can be increased to 65% or higher. As such, this system allows for the inclusion of natural carriers or fruit and vegetable purees or concentrates. In addition, the system of this invention can be operated with gentle drying conditions to provide high levels of volatile compound retention.

Figure 1:
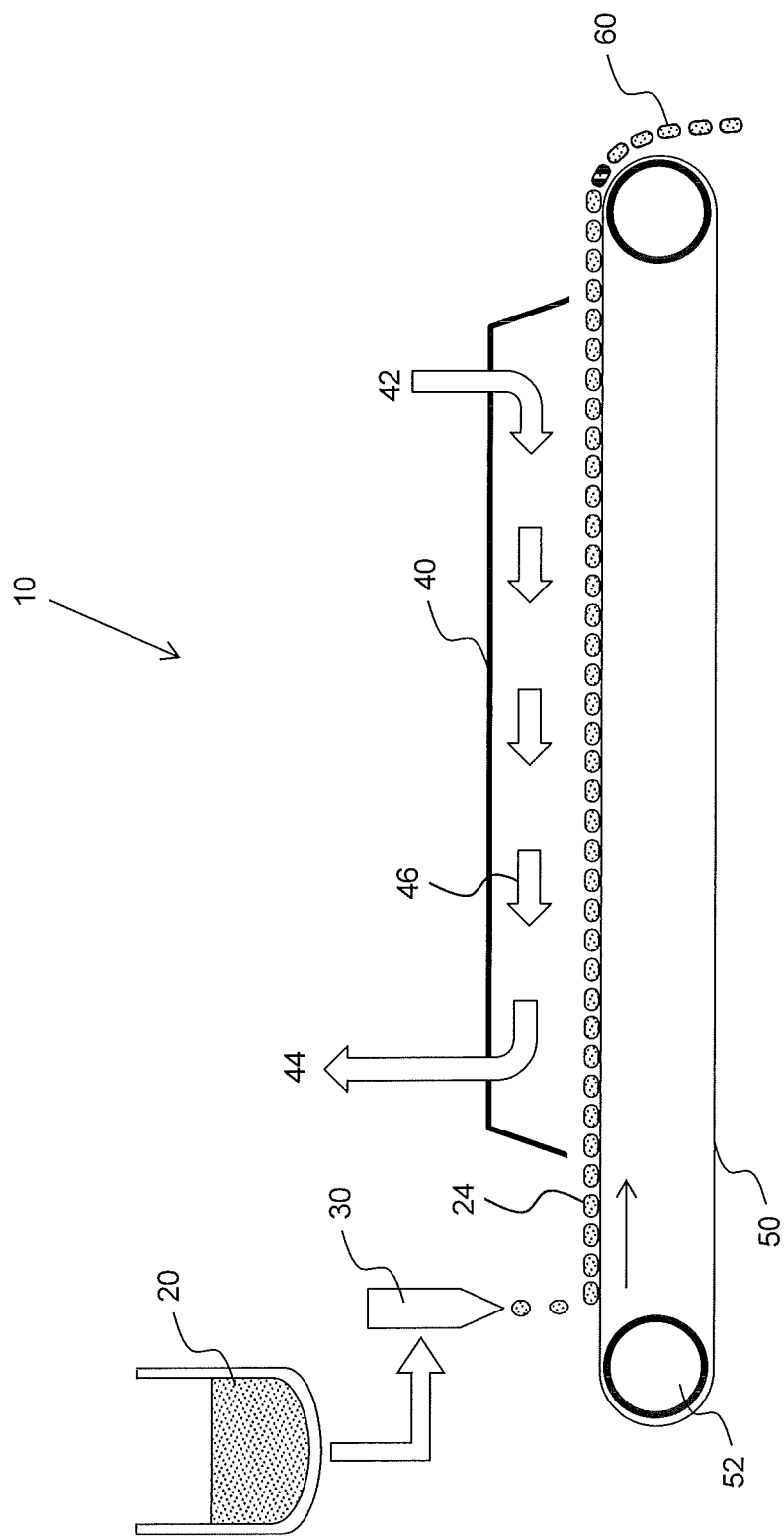
FIG. 1 depicts a system 10 for printing and drying flavors and fragrances.

With reference to FIG. 1, the system 10 of the invention includes a source of flavor or fragrance 20; a print assembly 30 adapted to print the flavor or fragrance; a drying component 40 with an air inlet 42 and outlet 44; and a movable product conveyor 50 that directly receives the printed flavor or fragrance 24. As the movable product conveyor 50 passes through or adjacent to the drying component 40, the printed flavor or fragrance 24 is dried via drying air 46 supplied by air inlet 42 and a free-flowing flavor or fragrance product 60 is produced.

The source of flavor or fragrance may be a vessel, container or tank, which holds a feed comprising at least one solute, in particular at least one flavor and/or fragrance. As used herein, the term "feed" means a solution composed of at least one solute dissolved in a solvent; a suspension composed of at least one solute in a solvent, wherein at least a portion of the solute is suspended or not dissolved in the solvent; a slurry composed of at least one insoluble substance in a solvent; or an emulsion composed of two immiscible liquids, one of which is dispersed in the other in the form of small droplets.

In one embodiment, the feed includes at least one flavor and/or fragrance and at least one solvent. In another embodiment, the feed consists of, or consists essentially of, at least one flavor or fragrance and at least one solvent. In some embodiments, the feed is a solution of flavor and/or fragrance dissolved (wholly or partially) in a solvent. In other embodiments, the feed is a suspension or slurry of flavor and/or fragrance particles in a solvent. In a further embodiment, the feed is an emulsion of at least one flavor and/or fragrance and a solvent.

As used herein, the term "solvent" means a compound that can be used to dissolve a solute, in particular at least one a flavor or fragrance. In one embodiment, the solvent is volatile, having an ambient-pressure boiling point of 150° C. or less. In another embodiment, the solvent has an ambient-pressure boiling point of 100° C. or less. Suitable solvents include water; alcohols such as methanol, ethanol, n-propanol, isopropanol, and butanol; ketones such as acetone, methyl ethyl ketone and methyl isobutyl ketone; esters such as ethyl acetate and propyl acetate; and various other solvents, such as tetrahydrofuran, acetonitrile, methylene chloride, toluene, and 1,1,1-trichloroethane. Lower volatility solvents such as dimethylacetamide or dimethylsulfoxide can also be used, generally in combination with a volatile solvent. Mixtures of organic solvents, such as 50% methanol and 50% acetone, can also be used, as can mixtures of organic solvents with water. Ideally, the solvent is water. However, in some embodiments, the solvent contains less than 50 wt % water. In another embodiment, the solvent contains less than 25 wt % water. In still another embodiment, the solvent contains less than 10 wt % water. In yet another embodiment, the solvent contains less than 5 wt % water. In another embodiment, the solvent contains essentially no water. The solvent selection can be based upon the solute to be dissolved and/or other considerations such as flammability or exhaust air volatile organic compounds released during drying.

In another embodiment, the feed is at least one flavor and/or fragrance in admixture with at least one carrier and at least one solvent. In another embodiment, the feed consists of, or consists essentially of, at least one flavor or fragrance, at least one solvent and at least one carrier. In some embodiments, the feed is a solution of flavor and/or fragrance and carrier dissolved (wholly or partially) in a solvent. In another embodiment, the feed is an emulsion of at least one flavor and/or fragrance, a carrier and a solvent. In a further embodiment, the feed is a suspension or slurry of flavor or fragrance particles suspended in a solution of a carrier dissolved in the solvent. It will be recognized that in such feed suspensions, a portion of the flavor or fragrance and the carrier may dissolve up to their solubility limits at the temperature of the feed suspension. In some embodiments, the feed is composed of colloidal materials, dissolved materials, and mixtures thereof. In other embodiments, the feed does not include a suspension, meaning that the feed does not contain crystalline or solid materials having diameters greater than 1000 nm. In this embodiment, the feed includes dissolved materials, colloidal materials, and mixtures thereof. In another embodiment, the feed is composed of dissolved materials.

As used herein, the term "carrier" refers to material that protects the flavor or fragrance from UV, moisture, oxidation, and/or loss; improves processing productivity, $T_g$, density, porosity, and/or flavor or fragrance intensity; and/or provides for controlled release of the flavor or fragrance as designed for a particular end-use application. A carrier can be a monomeric, oligomeric or polymeric material such as a sugar, sugar derivative, modified starch, protein, cellulose, salt, dextrin, gum, sugar alcohol, polyol, peptide, acid, carbohydrate, colloid or hydrocolloid. Particular examples of suitable materials include sugars such as sucrose, glucose, lactose, levulose, trehalose, fructose, maltose, ribose, dextrose, isomalt, sorbitol, mannitol, xylitol, lactitol, maltitol, arabinose, pentose, xylose, galactose; hydrogenated starch hydrolysates; inulin; hydrogenated corn syrup; oligosaccharides such as oligofructose; maltodextrins or dextrins (soluble fiber); polysaccharides such as dextran, pullulan, fructan, mannan, chitin, polydextrose, fleximer (a ring-opened form of dextran); hydrocolloids such as agar, gum acacia, modified gum acacia, sodium alginate, potassium alginate, ammonium alginate, calcium alginate or carrageenan; gums; polydextrose; underivatized celluloses and derivatized celluloses such as methyl cellulose, hydroxypropyl cellulose, cellulose acetate, ethyl cellulose, hydroxypropyl methyl cellulose, hydroxyethyl cellulose, hydroxypropyl methylcellulose phthalate, carboxymethyl cellulose, carboxymethyl ethylcellulose, hydroxypropyl methylcellulose acetate succinate, cellulose acetate phthalate and cellulose acetate trimellitate; underivatized starches and modified starches such as modified starch sold under the tradenames CAPSUL® (hydrogen octenylbutanedioate amylodextrin; National Starch, USA) or HICAP®, starch acetate and carboxymethyl starch; proteins such as gelatin, pea protein, soy and whey protein isolates and hydrolysates, and sodium caseinates; and derivatives and mixtures thereof. Also included are synthetic carriers, such as polyacrylates and polymethacrylates, vinyl excipients, polyethylenes, polyoxyethylenes, polypropylenes, polyamides, polyesters, polycarbonates, and derivatives and substituted versions thereof. The carrier can be selected based upon, amongst other factors, the desired flavor or fragrance, authenticity of taste or smell, and intensity to be achieved. In certain embodiments, the carrier is at least 50%, 55%, 60%, 70%, 80%, or 90% of the dried product. In other embodiments, the carrier is less than 50%, 45%, 40%, 35%, 30%, or 25% (e.g., less than 20%, 15%, 10%, 5%, or 1%) of the dried product. In other embodiments, the dried product does not include a carrier.

The flavor or fragrance of use in this invention may take the form of single raw materials or blends of oils optionally in admixture with a carrier and/or solvent; an encapsulated flavor or fragrance, i.e., a core-shell microcapsule; a food product, e.g., a pureed fruit or vegetable; a reaction flavor, or a combination thereof.

Single raw materials or blends of oils include extracts, naturally occurring plant and animal oils and exudates including complex mixtures of various chemical components such as aldehydes or alcohols, as well as esters, ketones or lactones of high polarity. Examples of flavors that can be included are acetaldehyde, dimethyl sulfide, ethyl acetate, ethyl propionate, methyl butyrate, and ethyl butyrate. Flavors containing volatile aldehydes or esters include, e.g., cinnamyl acetate, cinnamaldehyde, citral, diethylacetal, dihydrocarvyl acetate, eugenyl formate, and p-methylanisole. Further examples of volatile compounds that may be present in flavor oils include acetaldehyde (apple); benzaldehyde (cherry, almond); cinnamic aldehyde (cinnamon); citral, i.e., alpha citral (lemon, lime); neral, i.e., beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., melonal (melon); 2-6-dimethyloctanal (green fruit); and 2-dodecenal (citrus, mandarin); cherry; or grape and mixtures thereof. Flavors further include spice oleoresins derived from allspice, basil, capsicum, cinnamon, cloves, cumin, dill, garlic, marjoram, nutmeg, paprika, black pepper, rosemary, and turmeric, essential oils, anise oil, caraway oil, clove oil, eucalyptus oil, fennel oil, garlic oil, ginger oil, peppermint oil, onion oil, pepper oil, rosemary oil, spearmint oil, citrus oil, orange oil, lemon oil, bitter orange oil, tangerine oil, alliaceous flavors, garlic, leek, chive, and onion, botanical extracts, arnica flower extract, chamomile flower extract, hops extract, marigold extract, botanical flavor extracts, blackberry, chicory root, cocoa, coffee, kola, licorice root, rose hips, sarsaparilla root, sassafras bark, tamarind and vanilla extracts, protein hydrolysates, hydrolyzed vegetable proteins, meat protein hydrolysates, milk protein hydrolysates and compounded flavors both natural and artificial including those disclosed in S. Heath, Source Book of Flavors, Avi Publishing Co., Westport Conn., 1981, pages 149-277.

Examples of fragrance oils include, but are not limited to, animal fragrances such as musk oil, civet, castoreum, ambergris, plant fragrances such as nutmeg extract, cardamom extract, ginger extract, cinnamon extract, patchouli oil, geranium oil, orange oil, mandarin oil, orange flower extract, cedarwood, vetyver, lavandin, ylang extract, tuberose extract, sandalwood oil, bergamot oil, rosemary oil, spearmint oil, peppermint oil, lemon oil, lavender oil, citronella oil, chamomile oil, clove oil, sage oil, neroli oil, labdanum oil, eucalyptus oil, verbena oil, mimosa extract, narcissus extract, carrot seed extract, jasmine extract, olibanum extract, rose extract and mixtures thereof. Other examples of suitable fragrance oils include, but are not limited to, chemical substances such as acetophenone, adoxal, aldehyde C-12, aldehyde C-14, aldehyde C-18, allyl caprylate, ambroxan, amyl acetate, dimethylindane derivatives, α-amylcinnamic aldehyde, anethole, anisaldehyde, benzaldehyde, benzyl acetate, benzyl alcohol and ester derivatives, benzyl propionate, benzyl salicylate, borneol, butyl acetate, camphor, carbitol, cinnamaldehyde, cinnamyl acetate, cinnamyl alcohol, cis-3-hexanol and ester derivatives, cis-3-hexenyl methyl carbonate, citral, citronellol and ester derivatives, cumin aldehyde, cyclamen aldehyde, cyclo galbanate, damascones, decalactone, decanol, estragole, dihydromyrcenol, dimethyl benzyl carbinol, 6,8-dimethyl-2-nonanol, dimethyl benzyl carbinyl butyrate, ethyl acetate, ethyl isobutyrate, ethyl butyrate, ethyl propionate, ethyl caprylate, ethyl cinnamate, ethyl hexanoate, ethyl valerate, ethyl vanillin, eugenol, exaltolide, fenchone, fruity esters such as ethyl 2-methyl butyrate, galaxolide, geraniol and ester derivatives, helional, 2-heptonone, hexenol, α-hexylcinnamic aldehyde, hydroxycitronellal, indole, isoamyl acetate, isoeugenol acetate, ionones, isoeugenol, isoamyl iso-valerate, iso E super, limonene, linalool, lilial, linalyl acetate, lyral, majantol, mayol, melonal, menthol, p-methylacetophenone, methyl anthranilate, methyl cedrylene, methyl dihydrojasmonate, methyl eugenol, methyl ionone, methyl-β-naphthyl ketone, methylphenylcarbinyl acetate, mugetanol, γ-nonalactone, octanal, phenyl ethyl acetate, phenyl-acetaldehyde dimethyl acetate, phenoxyethyl isobutyrate, phenyl ethyl alcohol, pinenes, sandalore, santalol, stemone, thymol, terpenes, triplal, triethyl citrate, 3,3,5-trimethylcyclohexanol, γ-undecalactone, undecenal, vanillin, veloutone, verdox and mixtures thereof. Additional suitable fragrance oils can be found in U.S. Pat. Nos. 4,145,184, 4,209,417, 4,515,705, and 4,152,272.

A core-shell microcapsule refers a spherical microparticle, i.e., 50 nm to 2 mm in diameter, which has a core surrounded by a material that is distinctly different from that of the core. In accordance with the present invention, the core of the microcapsule includes a flavor or fragrance optionally in admixture with a carrier and/or solvent. In one embodiment, the core is a single flavor or fragrance or a blend of flavors and/or fragrances. In another embodiment, the core is a food product. In a further embodiment, the core is a reaction flavor. In yet another embodiment, the core-shell microcapsule containing the encapsulated flavor or fragrance is in admixture with a carrier and/or solvent.

The selection of appropriate shell material may be dependent upon the desired the physical and/or chemical properties of the resultant microcapsules. When selecting a wall polymer, the product requirements, i.e., stabilization, reduced volatility, release characteristics, environmental conditions, etc. should be taken into consideration. The polymer should be capable of forming a film that is cohesive with the core material. It should be chemically compatible, non-reactive with the core material and provide the desired wall properties such as strength, flexibility, impermeability, optical properties and stability.

Generally hydrophilic polymers, hydrophobic polymers amphipathic polymers, or a combination thereof are used for the microencapsulation process. Suitable wall materials include, but are not limited to, polyvinyl alcohol, cellulose acetate phthalate, polyacrylate, polyurea, polyurethane, polyamide, polyolefin, starch or modified starch, protein (e.g., gelatin), silica (e.g., sol-gel), fatty acid, lipid, wax, cellulose or modified cellulose (e.g., ethyl cellulose), gum (e.g., gum Arabic), rubber, melamine-formaldehyde, polystyrene and polyesters or combinations of these materials. The wall thickness can be varied considerably depending on the surface area of the core material to be coated and other physical characteristics of the system. Microcapsules can be prepared by any suitable method including spray drying, extrusion, fluidized bed, coacervation and the like. The preparation of microcapsules is known in the art and described in, e.g., Kirk-Othmer Encyclopedia of Chemical Technology, $5^{th}$ edition, as well as in U.S. Pat. Nos. 2,800,457, 3,870,542, 3,516,941, 3,415,758, 3,041,288, 5,112,688, 6,329,057, 6,261,483, US 2007/0138674 and WO 2017/058875. In a particular embodiment, the core-shell microcapsule is a silica microcapsule. In another embodiment, the core-shell microcapsule is a polyacrylate microcapsule.

Food products include solids of fruits, vegetables, nectars, nectar- or sap-derived products such as syrups or any combination thereof. Fruit and vegetable solids can be obtained from fruit/vegetable purees and/or juices. The plant-derived products may further include natural color and/or natural flavor. The term "natural" as used herein, means derived from a fruit or vegetable. As is conventional in the art, nectar refers to a sugar-rich liquid produced by plants in glands called nectaries, which are found within flowers. A syrup refers to a viscous liquid composed primarily of sugar and water. Syrups can be made by reducing naturally sweet juices such as cane juice or maple sap. Suitable fruits, vegetables, nectars, and nectar- or sap-derived food products include, but are not limited to, apple, apricot, banana, blueberries, broccoli, green cabbage, red cabbage, carrots, cantaloupe, cauliflower, cherries, celery, cranberries, cucumber, grapes, eggplant, grapefruit, iceburg lettuce, oranges, peas, peaches, peppers, pear, potato, pineapple, radish, plum, spinach, raspberries, zucchini, strawberries, tomato, watermelon, acai, black currant, kiwi, lemon, lime, mango, pomegranate, prickly pear, asparagus, beet, butternut squash, chard, kale, sweet potato, agave syrup, maple syrup, and combinations thereof. Given that many of these food products can contain between 70 and 96% (w/w) water, and 4 to 30% (w/w) solids, certain embodiments provide a food product that does not include an exogenous solvent or carrier. However, in other embodiments, the food product to be printed and dried includes an exogenous solvent, an exogenous carrier, or an exogenous solvent and carrier.

Reaction flavors are those flavors generated as a result of heating a mixture of starting materials such as carbohydrates, proteins, and fats for a period of time long enough to yield a desired profile. Reaction flavor develop by chemical reactions such as Maillard reactions, Schiff base reactions, Strecker reactions and caramelization reactions, and/or other beneficial flavor reactions. Materials that can be used in the development of reaction flavors include, but are not limited to, lipids or fats, reducing sugars, free amino acids, alternate protein sources such as hydrolyzed vegetable proteins (HVPs) or Yeast autolysates and a small amount of water to initiate the reaction. Suitable amino acids are natural or non-natural, standard or derivative. Examples include Glycine, Alanine, Valine, Leucine, Isoleucine, Serine, Cysteine, Selenocysteine, Threonine, Methionine, Proline, Phenylalanine, Tyrosine, Tryptophan, Histidine, Lysine, Arginine, Aspartate, Glutamate, Asparagine, Glutamine, 5-hydroxytryptophan (5-HTP), L-dihydroxy-phenylalanine (L-DOPA), and Eflornithine. Reducing sugars are those that either have an aldehyde group or are capable of forming one in solution through isomerism. The aldehyde group allows the sugar to act as a reducing agent in the Maillard reaction, important in the browning of many foods. Cyclic hemiacetal forms of aldoses can open to reveal an aldehyde and certain ketoses can undergo tautomerization to become aldoses. Examples of reducing sugars include glucose, fructose, xylose, glyceraldehyde, galactose, lactose, arabinose, maltose, glucose polymers such as starch, hydrolyzed starch, and starch-derivatives like glucose syrup, maltodextrin, and dextrin. Processes for producing reaction flavors are known in the art and disclosed in, e.g., US 2017/0027205.

In certain embodiments, the flavor or fragrance feed to be printed contains between 1% and 50%, or more preferably 10% and 40%, or most preferably between 20% and 40% by weight of flavor or fragrance. When a carrier is included, the solids of the flavor or fragrance feed can be in the range of 10% to 80%, or more preferably in the range of 20% to 65%, or most preferably between 30% and 50%. In certain embodiments, the feed solids content of the flavor or fragrance feed is at least 50%, 60%, 70%, or 80%. The amount of flavor and/or carrier can be adjusted by using more or less solvent depending on the solubility of the carrier material and various factors related to efficient operation of the system.

Alternatively, or in addition to flavors and fragrances, the feed can include other active materials. These materials include ingredients such as taste masking agents, taste sensates, acidulants, sweeteners, vitamins, dyes, colorants, pigments, surfactants, antioxidants, anti-inflammatory agents, anesthetics, analgesics, anti-fungal agents, antibiotics, anti-viral agents, anti-parasitic agents, enzymes and co-enzymes, anti-histamines, and chemotherapeutic agents.

Taste masking agents are substances for masking one or more unpleasant taste sensations, in particular a bitter, astringent and/or metallic taste sensation or aftertaste, which substances can be a constituent of the products according to the invention. Examples include lactisol (2-O-(4-methoxyphenyl) lactic acid; see U.S. Pat. No. 5,045,336), 2,4-dihydroxybenzoic acid potassium salt (see U.S. Pat. No. 5,643,941), ginger extracts (see GB 2,380,936), neohesperidine dihydrochalcone, specific flavones (2-phenylchrom-2-en-4-ones; see U.S. Pat. No. 5,580,545), specific nucleotides, for example cytidine-5'-monophosphates (CMP; see US 2002/0177576), specific sodium salts, such as sodium chloride, sodium citrate, sodium acetate and sodium lactate, a lipoprotein of β-lactoglobulin and phosphatidic acid, neodiosmine (5,7-dihydroxy-2-(4-methoxy-3-hydroxyphenyl)-7-O-neohesperidosyl-chrom-2-en-4-one; see U.S. Pat. No. 4,154,862), preferably hydroxyflavanones such as 2-(4-hydroxyphenyl)-5,7-dihydroxychroman-4-one (naringenin), 2-(3,4-dihydroxyphenyl)-5,7-dihydroxychroman-4-one (eriodictyol), 2-(3,4-dihydroxyphenyl)-5-hydroxy-7-methoxychroman-4-one (eriodictyol-7-methylether), 2-(3,4-dihydroxyphenyl)-7-hydroxy-5-methoxychroman-4-one (eriodictyol-5-methylether) and 2-(4-hydroxy-3-methoxyphenyl)-5,7-dihydroxychroman-4-one (homoeriodictyol), the (2S)- or (2R)-enantiomers thereof or mixtures thereof as well as the mono- or polyvalent phenolate salts thereof with $Na^+$, $K^+$, $NH_4^+$, $Ca^{2+}$, $Mg^{2+}$ or $Al^{3+}$ as counter cations or γ-aminobutyric acid (4-aminobutyric acid, as the neutral form ("inner salt") or in the carboxylate or ammonium form). See WO 2005/096841.

Taste sensates include hot tasting, salivation-inducing substances, substances causing a warmth or tingling feeling, and cooling active ingredients. Examples of hot tasting and/or salivation-inducing substances and/or substances which cause a feeling of warmth and/or a tingling feeling on the skin or on the mucous membranes and which can be a constituent of the dried product include capsaicin, dihydrocapsaicin, gingerol, paradol, shogaol, piperine, carboxylic acid-N-vanillylamides, in particular nonanoic acid-N-vanillylamide, pellitorin or spilanthol, 2-nonanoic acid amides, in particular 2-nonanoic acid-N-isobutylamide, 2-nonanoic acid-N-4-hydroxy-3-methoxyphenylamide, alkyl ethers of 4-hydroxy-3-methoxybenzyl alcohol, in particular 4-hydroxy-3-methoxybenzyl-n-butylether, alkyl ethers of 4-acyloxy-3-methoxybenzyl alcohol, in particular 4-acetyloxy-3-methoxybenzyl-n-butylether and 4-acetyloxy-3-methoxybenzyl-n-hexylether, alkyl ethers of 3-hydroxy-4-methoxybenzyl alcohol, alkyl ethers of 3,4-dimethoxybenzyl alcohol, alkyl ethers of 3-ethoxy-4-hydroxybenzyl alcohol, alkyl ethers of 3,4-methylene dioxybenzyl alcohol, (4-hydroxy-3-methoxyphenyl)acetic acid amides, in particular (4-hydroxy-3-methoxyphenyl) acetic acid-N-n-octylamide, vanillomandelic acid alkylamides, ferulic acid-phenethylamides, nicotinaldehyde, methylnicotinate, propylnicotinate, 2-butoxyethylnicotinate, benzylnicotinate, 1-acetoxychavicol, polygodial and isodrimeninol, further preferred cis- and/or trans-pellitorin according to WO 2004/000787 or WO 2004/043906, alkenecarboxylic acid-N-alkylamides according to WO 2005/044778, mandelic acid alkylamides according to WO 03/106404 or alkyloxyalkanoic acid amides according to WO 2006/003210. Examples of preferred hot tasting natural extracts and/or natural extracts which cause a feeling of warmth and/or a tingling feeling on the skin or on the mucous membranes and which can be a constituent of the products according to the invention include extracts of paprika, extracts of pepper (for example capsicum extract), extracts of chili pepper, extracts of ginger roots, extracts of *Aframomum melgueta*, extracts of *Spilanthes-acmella*, extracts of *Kaempferia galangal* or extracts of *Alpinia galanga*.

Suitable cooling active ingredients include the following: 1-menthol, d-menthol, racemic menthol, menthone glycerol acetal, menthyl lactate, menthyl lactate (preferably being 1-menthyl lactate, in particular 1-menthyl-1-lactate), substituted menthyl-3-carboxamides (for example menthyl-3-carboxylic acid-N-ethylamide), 2-isopropyl-N-2,3-trimethylbutanamide, substituted cyclohexane carboxamides, 3-menthoxypropane-1,2-diol, 2-hydroxyethyl menthyl carbonate, 2-hydroxypropyl menthyl carbonate, N-acetylglycine menthyl ester, isopulegol, hydroxycarboxylic acid menthyl esters (for example menthyl-3-hydroxybutyrate), monomenthyl succinate, 2-mercaptocyclodecanone, menthyl-2-pyrrolidin-5-onecarboxylate, 2,3-dihydroxy-p-menthane, 3,3,5-trimethylcyclohexanone glycerol ketal, 3-menthyl-3,6-di- and -trioxaalkanoates, 3-menthyl methoxyacetate and icilin. Cooling active ingredients which are particularly preferred include 1-menthol, racemic menthol, menthone glycerol acetal, menthyl lactate (preferably 1-menthyl lactate, in particular 1-menthyl-1-lactate), 3-menthoxypropane-1,2-diol, 2-hydroxyethyl menthyl carbonate, and 2-hydroxypropyl menthyl carbonate.

Acidulants are additives that increase acidity or impart a tart taste. Any edible, food grade organic or inorganic acid, such as, but not limited to, citric acid, malic acid, succinic acid, acetic acid, hydrochloric acid, adipic acid, tartaric acid, fumaric acid, phosphoric acid, lactic acid, sodium acid pyrophosphate, salts thereof, and combinations thereof can be used as an acidulant.

Sweetners are substances used to sweeten food or drink. Examples of sweeteners include, e.g., sucrose, fructose, glucose, high fructose corn syrup, *Stevia rebaudiana* extracts, rebaudioside A (Reb A), stevioside, Reb D, xylose, arabinose, or rhamnose, as well as sugar alcohols such as erythritol, xylitol, mannitol, sorbitol, inositol and a combination thereof. Artificial sweeteners can include, for example, aspartame, sucralose, neotame, acesulfame potassium, saccharin and a combination thereof.

Vitamins include any vitamin, a derivative thereof and a salt thereof. Examples include vitamin A and its analogs and derivatives (e.g., retinol, retinal, retinyl palmitate, retinoic acid, tretinoin, and iso-tretinoin, known collectively as retinoids), vitamin E (tocopherol and its derivatives), vitamin C (L-ascorbic acid and its esters and other derivatives), vitamin B3 (niacinamide and its derivatives), alpha hydroxy acids (such as glycolic acid, lactic acid, tartaric acid, malic acid, citric acid, etc.) and beta hydroxy acids (such as salicylic acid and the like).

The products according to the invention can contain, for example, the following dyes, colorants or pigments: lactoflavin (riboflavin), beta-carotene, riboflavin-5'-phosphate, alpha-carotene, gamma-carotene, cantaxanthin, erythrosine, curcumin, quinoline yellow, yellow orange S, tartrazine, bixin, norbixin (annatto, orlean), capsanthin, capsorubin, lycopene, beta-apo-8'-carotenal, beta-apo-8'-carotenic acid ethyl ester, xantophylls (flavoxanthin, lutein, cryptoxanthin, rubixanthin, violaxanthin, rodoxanthin), fast carmine (carminic acid, cochineal), azorubin, cochineal red A (Ponceau 4 R), beetroot red, betanin, anthocyanins, amaranth, patent blue V, indigotine I (indigo-carmine), chlorophylls, copper compounds of chlorophylls, acid brilliant green BS (lissamine green), brilliant black BN, vegetable carbon, titanium dioxide, iron oxides and hydroxides, calcium carbonate, aluminum, silver, gold, pigment rubine BK (lithol rubine BK), methyl violet B, victoria blue R, victoria blue B, acilan brilliant blue FFR (brilliant wool blue FFR), naphthol green B, acilan fast green 10 G (alkali fast green 10 G), ceres yellow GRN, sudan blue II, ultramarine, phthalocyanine blue, phthalocayanine green, fast acid violet R. Further naturally obtained extracts (for example paprika extract, black carrot extract, red cabbage extract) can be used for coloring purposes.

Examples of suitable emulsifiers or surfactants include, but are not limited to, lecithins, sucrose esters, polysorbates (e.g., polyoxyethylene sorbitan monolaurate, polyoxyethylene sorbitan monooleate, polyoxyethylene sorbitan monopalmitate, polyoxyethylene sorbitan monostearate, polyoxyethylene sorbitan tristearate), proteins, gums (e.g., gum Arabic or gum tragacanth), soap-bark extract (e.g., quillaja extract), saponins, and the like.

Examples of antioxidants include beta-carotene, vitamin C (Ascorbic Acid) or an ester thereof, vitamin A or an ester thereof, vitamin E or an ester thereof, lutein or an ester thereof, lycopene, selenium, flavonoids, vitamin-like antioxidants such as coenzyme Q10 (CoQ10) and glutathione, and antioxidant enzymes such as superoxide dismutase (SOD), catalase, and glutathione peroxidase.

Anti-inflammatory agents include, e.g., methyl salicylate, aspirin, ibuprofen, and naproxen. Additional anti-inflammatories include corticosteroids, such as, but not limited to, flurandrenolide, clobetasol propionate, halobetasol propionate, fluticasone propionate, betamethasone dipropionate, betamethasone benzoate, betamethasone valerate, desoximethasone, dexamethasone, diflorasone diacetate, mometasone furoate, halcinonide, fluocinonide, fluocinolone acetonide, desonide, triamcinolone acetonide, hydrocortisone, hydrocortisone acetate, fluorometholone, methylprednisolone, and predinicarbate.

Anesthetics include benzocaine, butamben, butamben picrate, cocaine, procaine, tetracaine, lidocaine and pramoxine hydrochloride.

Suitable analgesics include, but are not limited to, ibuprofen, diclofenac, capsaicin, and lidocaine.

Non-limiting examples of anti-fungal agents include micanazole, clotrimazole, butoconazole, fenticonasole, tioconazole, terconazole, sulconazole, fluconazole, haloprogin, ketonazole, ketoconazole, oxinazole, econazole, itraconazole, torbinafine, nystatin and griseofulvin.

Non-limiting examples of antibiotics include erythromycin, clindamycin, synthomycin, tetracycline, metronidazole and the like.

Anti-viral agents include, but are not limited to, famcyclovir, valacyclovir and acyclovir.

Examples of enzymes and co-enzymes include co-enzyme Q10, papain enzyme, lipases, proteases, superoxide dismutase, fibrinolysin, desoxyribonuclease, trypsin, collagenase and sutilains.

Anti-histamines include, but are not limited to, chlorpheniramine, brompheniramine, dexchlorpheniramine, tripolidine, clemastine, diphenhydramine, prometazine, piperazines, piperidines, astemizole, loratadine and terfonadine.

Non-limiting examples of chemotherapeutic agents include 5-fluorouracil, masoprocol, mechlorethamine, cyclophosphamide, vincristine, chlorambucil, streptozocin, methotrexate, bleomycin, dactinomycin, daunorubicin, coxorubicin and tamoxifen.

In some embodiments, the amount of the additional active material is from 0.1% to 50% (e.g., 0.2 to 40%, 0.3 to 30%, 0.4 to 20%, and 0.5 to 10%) by weight of the flavor or fragrance product.

Depending on the form of the flavor or fragrance to be printed and dried, the feed can have a viscosity in the range of 100 cP (centipoise) or mPa-s (millipascal-second) to 10,000 cP or mPa-s. In some embodiments, the feed has a viscosity of more than 100 cP, more than 200 cP, more than 300 cP, more than 400 cP, more than 500 cP, more than 600 cP, more than 700 cP, more than 800 cP, more than 900 cP or more than 1000 cP. In other embodiments, the feed has a viscosity of less than 10,000 cP, 9000 cP, less than 8000 cP, less than 7000 cP, less than 6000 cP, or less than 5000 cP.

Figure 2:
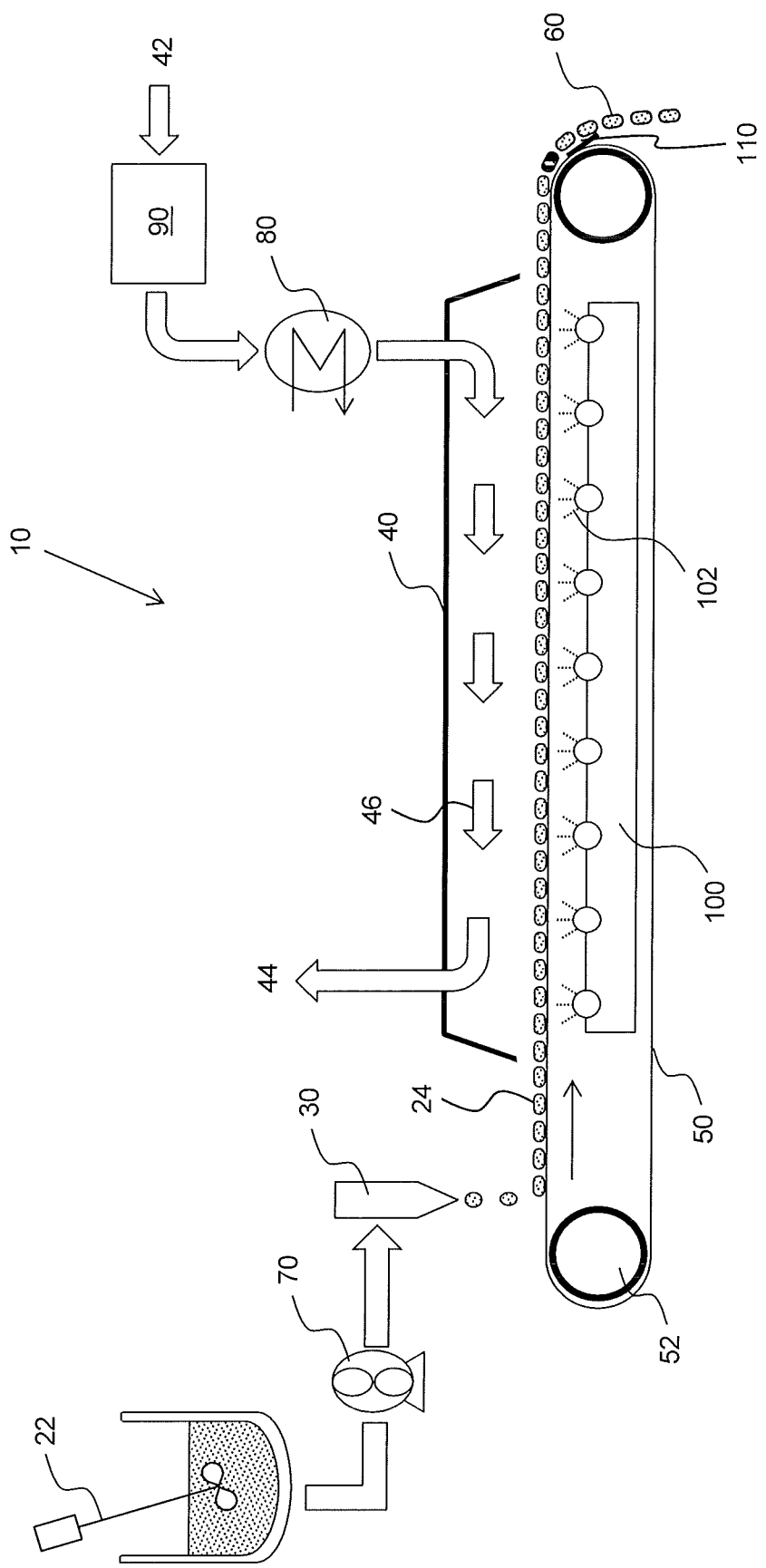
FIG. 2 depicts the system 10 of the invention with optional components including a mixer 22 to keep the feed suspension homogeneous while processing, a feed pump 70, an air heater 80 to heat the inlet air 42, an air dehumidifier 90 configured to supply desiccated inlet air to the drying component, a supplemental energy source 100 to facilitate drying of the printed flavor or fragrance 24, and a product discharge component 110 for removing dried product 60 from the movable product conveyor 50.

To maintain a homogenous feed solution, slurry, suspension or emulsion, the source of flavor or fragrance can be in the form of a mixing chamber with a mixer 22 (FIG. 2), e.g., a rotatable shaft with mixing blades. Delivery of the feed from the source of flavor or fragrance 20 to the print assembly 30 can be facilitated via a pump 70, e.g., a high viscosity melt pump, high performance liquid chromatography (HPLC) pump or gear pump, or other delivery device (FIG. 2). The print assembly 30 is then used to print the flavor or fragrance feed 24 on a movable product conveyor 50.

Figure 3:
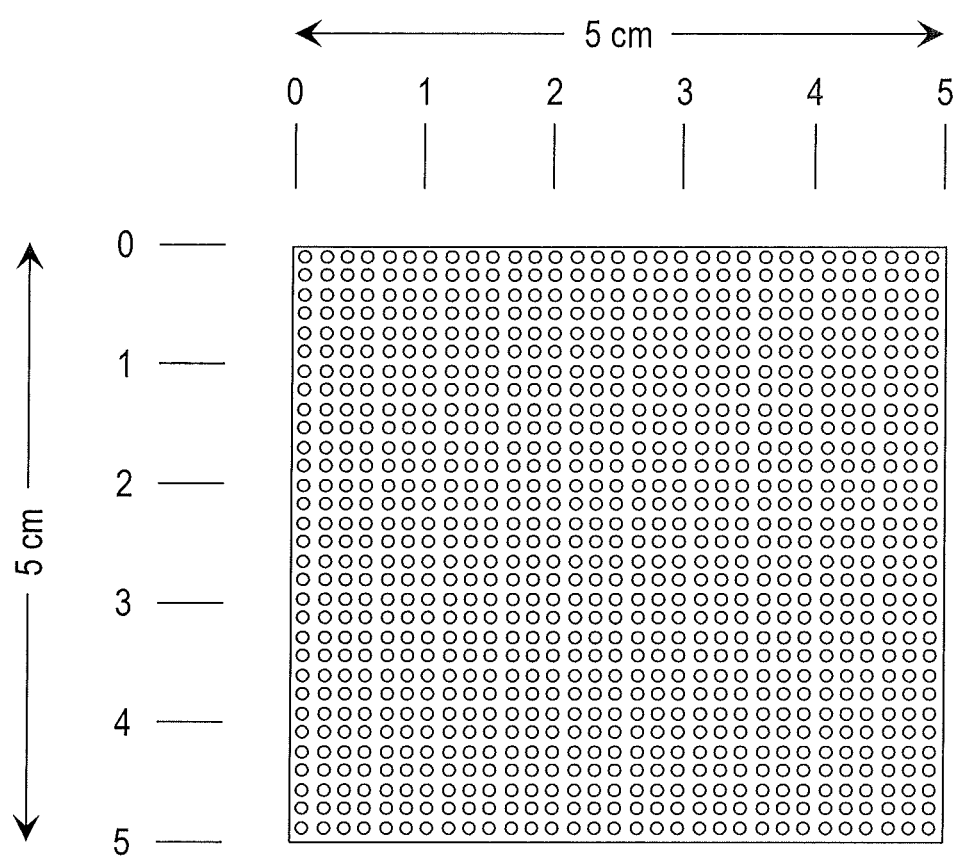
FIG. 3 depicts a plurality of flavor or fragrance dots printed in a pattern or array.

The print assembly of the system of this invention prints, drops or deposits the flavor or fragrance directly on the movable product conveyor in discrete, predefined shapes. In this respect, the print assembly is distinct from a spray dryer nozzle, which atomizes the feed. The feed can be printed as letters, numbers, or geometric shapes including but not limited to, squares, circles or dots, triangles, rectangles, hexagons, etc. In addition, the feed can be printed on the movable product conveyor in a predefined pattern, in particular a dot pattern. Ideally, the pattern is selected to facilitate drying, post-processing, and product quality. In some embodiments, the printed shape is a three-dimensional dot, such as a mini-pastille or mini-troche, e.g., a 0.04 $mm^3$ to 10 $mm^3$. In another embodiment, a plurality of dots is printed in a pattern or array such that the dots are evenly distributed and spaced for optimal drying, post-processing, and product quality, e.g., center point-to-center point spacing of 1 to 10 mm between dots (see FIG. 3). Alternatively, the spacing of the dots can be a factor of their diameter, e.g., a center-to-center spacing of "1D" means the edges of the dots are just touching other, whereas "2D" means that center-to-center spacing of the dots is two times the diameter. By way of illustration, FIG. 3 illustrates a spacing of 2D.

Ideally, the print assembly is adapted to print a flavor or fragrance feed having a viscosity in the range of 100 cP to 10,000 cP. In some embodiments, the print assembly is adapted to print a flavor or fragrance feed having a viscosity at least 200 cP, 300 cP, 400 cP, 500 cP, 600 cP, 700 cP, 800 cP, 900 cP, 1000 cP, 2000 cP, 3000 cP, 4000 cP, 5000 cP, 6000 cP, 7000 cP, 8000 cP, 9000 cP, or 10000 cP.

The print assembly of the system of this invention can be a non-contact print assembly, e.g., an inkjet-type print head or array of nozzles that drop or deposit the material on a surface; or a contact print assembly, e.g., flat bed screen, rotary screen, reverse gravure or flexography print assembly. In particular embodiments, the print assembly is a non-contact print assembly.

In general, there are two common types of jetting modes for non-contact print assemblies, continuous mode (CM) and drop-on-demand (DOD). In continuous mode jetting, an unbroken jet of fluid projects from an orifice; Rayleigh instabilities cause the jet to break up into individual droplets after a certain flight distance. In demand mode, individual droplets are ejected from an orifice, usually as a result of a pulsed energy source.

Various types of jetting heads have been developed for various types of materials and deposition requirements. Operating principles can be either electromechanical pumping of the fluid or thermally driven pumping. In some embodiments, a thermal actuator is used to eject material through a nozzle. In accordance with this embodiment, the print head can be produced as a 'roof-shooter' or 'side shooter,' depending on the placement of the heating element relative to the nozzle orifice. Bubble-jet technologies use such approaches, heating the water-based ink until the water vaporizes and using the vapor pressure to cause a droplet to be ejected.

In other embodiments, piezoelectric actuators are used to eject material through a nozzle. These piezoelectric actuators can be used for either continuous or demand mode of printing. Piezoelectric nozzles can exist in a variety of designs, which can be categorized based on the mode of piezoceramic deformation employed and the location of the actuator: squeeze, bend, push and shear. In a standard bend-mode design, the piezoelectric element expands and puts pressure on a diaphragm, which interfaces directly with the feed reservoir to promote fluid ejection. Push-mode configurations are similar, except that the polarization of the piezoelectric is perpendicular to the ejection path rather than parallel. In both cases, the electric field generated is parallel with the polarization of the piezomaterial. Shear-mode configurations, in contrast, create the piezoelectric deformation with an electric field perpendicular to the polarization of the piezoceramic element. Squeeze-mode jets contain cylindrical channels surrounded by thin tubes of piezoceramic; when the piezoelectric element is actuated it 'squeezes' the channels.

Various aspects of printing have been described (Lee (2003) *Microdrop Generation*, CRC Press LLC, Boca Raton, FL), including printing of polymers (Gao & Sonin (1994) *Proc. Royal Soc. London* (A) 444:533-54), metals (Liu & Orme (2001) *J. Mat. Proc. Technol.* 115:271-83), and ceramics (Seerden, et al. (2001) *J. Am. Ceram. Soc.* 84:2514-20).

MicroFab Technologies (Plano, TX) is a well-known supplier of jetting equipment that supplies heads using piezoelectric actuation. In addition, other companies, such as FUJIFILM Dimatix (Santa Clara, CA) and Xaar (East Dorset, VT), produce print-head arrays with up to 1000 nozzles. In solid freeform fabrication, print-heads for printing viscous polymers have been developed. For example, Sanders Inc. (Merrimack, NH) provides two jetting nozzles, one for a wax-based part material and the other for support structure for printing high-resolution three-dimensional wax objects. Similarly, print-heads produced by 3D Systems (Rock Hill, SC) can be used to print wax material with resolutions in the range of 300 to 600 dpi. Further, Objet Geometries (Rehovot, Israel) produces print heads with several hundred nozzles that are capable of printing polymeric materials. In some embodiments, acoustic focusing at ultrasonic driving frequencies is used to eject high viscosity fluids. In one embodiment, the print assembly is a print head. In another embodiment, the print assembly is an array of nozzles.

Aside from the standard CS and DOD methods, other technologies have been investigated. For example, liquid spark jetting, a relative of thermal jetting, relies on an electrical spark discharge instead of a resistor to form a gas bubble in the reservoir. The electrohydrodynamic inkjet employs a powerful electric field to pull a meniscus and, under very specific conditions, droplets from a pressure-controlled capillary tube; these droplets are significantly smaller than the tube from which they emanate. Electro-rheological fluid jetting uses an ink whose properties change under high electric fields; the fluid flows only when the electric field is turned off. In flex-tensional ultrasound droplet ejectors, both drop-on-demand and continuous droplet formation can be achieved, wherein a plate containing the nozzle orifice acts as the actuator, vibrating at resonant frequencies and forming droplets by creating capillary waves on the liquid surface as well as an increased pressure in the liquid. Focused acoustic beam ejection uses a lens to focus an ultrasound beam onto the free surface of a fluid, using the acoustic pressure transient generated by the focused tone burst to eject a fluid droplet (Elrod, et al. (1989) *J. Appl. Physics* 65:3441-7). A variant of this involves ultrasonic waves focused onto the surface of the liquid, thereby forming surface waves that eventually break off into a mist of small droplets (Fukumoto, et al. (2000) *J. Imag. Sci. Technol.* 44:398-405). Ultrasonic droplet generation systems have been described for printing fluids of up to 3000 cP of viscosity (Kiyama, et al. (2011) *IEEE* 88-93).

Jetting systems that combine mechanical and pneumatic mechanisms are also known in the art for applying higher forces to viscous jetting materials. For example, EFD PICODOT jet valves (Nordson EFD, UK) provide a high jetting frequency and can handle fluids with viscosities ranging from 50 cP to 500,000 cP. Nozzles are available with 50 μm, 100 μm, 150 μm, 200 μm, 300 μm and 400 μm orifice diameters to accommodate a wide range of dot sizes. An LV type valve is suitable for the viscosity range from low viscosity up to 1000 cP, and MV type valve for viscosity range from 1000 cP up to 500,000 cP, both with a 50 μm nozzle being used for jetting. Parameters for jetting different viscosity fluids have been studies and are described by Yang, et al. (2013) *Solid Freeform Fabric. Proc.* pg. 505-513.

In some embodiments, the fragrance or flavor is provided at a droplet diameter of between 100 microns and 5 mm, or more preferably between 425 microns and 1 mm. As is conventional in the art, a droplet smaller than 425 microns (i.e., a particle passing through a 40 mesh sieve) is considered dust. The smaller droplets can be obtained with a smaller nozzle diameter and higher pressures, whereas a larger nozzle diameter and lower pressures are used to obtain larger droplet sizes.

For convenience, the source of flavor or fragrance, is often maintained at near-ambient temperatures; however, this is not a limitation of the disclosed system or method. Generally, the temperature of the source of flavor or fragrance can range from 0° C. to 80° C. or even higher. Temperatures of less than 0° C. may also be utilized, especially when there are stability concerns about the feed. Likewise, the rest of the system, in particular the print assembly and optional pump, can be used at any suitable temperature that does not alter the smell of a fragrance or taste of a flavor. In certain embodiments, the system is at or about room temperature (e.g., 20-25° C.). However, when the viscosity of a flavor or fragrance is high, the flavor or fragrance can optionally be heated to, e.g., 32 to 80° C. without altering the taste or smell of the flavor or fragrance, respectively.

As depicted in FIG. 1 and FIG. 2, the flavor or fragrance feed is directly printed on a movable product conveyor 50 that traverses or is adjacent to a drying component 40. Ideally, the movable product conveyor 50 provides a non-stick surface onto which the flavor or fragrance feed is printed and dried as the printed feed 24 is conveyed through the drying component 40. A surface is considered "non-stick" when an adherent material can be easily removed without significant force or is completely prevented from adhering altogether. The movable product conveyor can be a relatively thin, flexible sheet or belt which is supported by a suitable support system 52, as shown in FIG. 1 and FIG. 2. In an alternative embodiment, which is not shown, the movable product conveyor can be configured as a substantially rigid tray or bed. When the movable product conveyor is a belt or sheet, the support system 52 can include conventional circulating conveyer belt components, e.g., an electric motor, drive roller and drive linkage to transfer power from the motor to the drive roller. A speed controller, such as an alternating current variable speed control device or the like, can also be included to control the output speed of the motor. In some embodiments, the movable product conveyor moves continuously through or adjacent to the drying component. In other embodiments, the movable product conveyor moves in a discontinuous manner through or adjacent to the drying component, i.e., the conveyor stops for predefined periods of time to extend exposure of the printed feed to drying air provided by the drying component.

As shown in FIG. 1 and FIG. 2, the flavor or fragrance feed printed on the movable product conveyor 50 passes through or is adjacent to the drying component 40 and is exposed to drying air 46 supplied via an air inlet 42. In this respect, the air of the drying component is in fluid contact with the flavor or fragrance feed printed on the movable product conveyor. Drying air 46 circulates through the drying component 40, streaming over and around the printed feed 24 to evaporate moisture, and exits the drying component 40 via air outlet 44. In some embodiments, the flow of the drying air is essentially parallel to the movable product conveyor 50. In other embodiments, the flow of the drying air is in a straight or rotary downward direction toward the movable product conveyor 50. In certain embodiments, the flow of the drying air is in the same direction as the product flow. In other embodiments, the flow of the drying air is in the opposite direction as the product flow.

The air supplied to the drying component may be air from the surrounding environment, a gas other than air, or a combination thereof. Inert gases, for example nitrogen gas and carbonate gas, can be used. For readily oxidizable substances, inert gases may be preferred.

The temperature of the inlet air supplied to the drying component is ideally in the range of 30° C. to 160° C., preferably 30° C. to 110° C., more preferably 40° C. to 100° C., and most preferably 40° C. to 90° C. In certain embodiments, the temperature of the inlet air is less than 100° C. When the inlet air is above ambient room temperature, the system can further include an air heater 80 to heat the inlet air (FIG. 2). The air heater may be configured to operate using either electrical power or gas. Accordingly, in some embodiments, the system can further include a gas radiant heater or electric heater. The term "gas radiant heater" means devices which produce substantially radiant heat by combusting gas. The term "electric radiant heater" means devices which produce substantially radiant heat by drawing electrical current. Various forms of such heaters are known in the art.

The relative humidity (RH) of the inlet air supplied to the drying component may be 35% RH or less, preferably 15% RH or less, more preferably 7% RH or less, and most preferably 1% RH or less. When the inlet air RH is above ambient levels, the system can further include air dehumidifier 90 configured to supply desiccated air to the drying component (FIG. 2). Accordingly, the system can have both a dehumidifying and drying function. A drying component capable of blowing a high volume of desiccated air with a dew point of less than 5° C. is preferable. For a drying component with no dehumidifying function, the drying component can be modified to include a dry dehumidifier, e.g., a honeycomb-type rotary dehumidifier (e.g., Nichias Corporation or Sweden PROFLUTE Corporation).

To facilitate drying of the printed flavor or fragrance, the system can be modified to include a supplemental energy source. Ideally, the supplemental energy source provides dry radiant heat, i.e., heat energy which is transmitted from one body to another by the process generally known as radiation, as differentiated from the transmission of heat from one body to another by the processes generally known as conduction and convection.

Dry radiant heat sources are known in the art and can attain high temperatures and can produce large quantities of radiant heat energy. Such heaters can attain temperatures of at least 100° C. and can attain temperatures significantly greater than 100° C. The high temperatures attainable by these heaters can be beneficial in producing large amounts of heat energy. In addition, the temperature of the heater, and thus the amount of radiant heat energy produced, can be relatively quickly changed and can be easily regulated by proportional modulation thereof. Also, such heaters generally tend to be relatively light in weight compared to other heat sources and are generally resistant to shock and vibration.

Examples of suitable dry radiant heat sources include, but are not limited to, infrared and other light devices, electric radiant heaters, and radiant gas heaters. Since electric radiant heaters such as quartz heaters and ceramic heaters draw electrical power for operation, such heaters can be operated either from a portable generator, or from a permanent electrical power grid. Similarly, radiant gas heaters can be operated either from a portable gas supply, such as a liquified natural gas tank, or from a gas distribution system such as an underground pipeline system. Furthermore, heaters such as those discussed above are generally known to provide long, reliable operating life and can be serviced easily. Additional sources of energy include, but are not limited to, microwaves or radio frequency waves.

As shown in FIG. 2, the supplement energy source 100 can be configured to direct radiant heat 102 toward the lower side of the movable product conveyor 50, i.e., the side opposite that which the flavor or fragrance feed 24 is printed. However, in an alternative embodiment of the present invention which is not shown, a supplemental energy source directs radiant heat toward the side of the movable product conveyor which the flavor or fragrance feed is printed. In yet another alternative embodiment which is not shown, reflectors or the like can be employed to direct radiant heat from the supplement energy source toward the printed feed. Movable product conveyors adapted to include one or more supplemental energy sources are known in the art and described, e.g., in U.S. Pat. Nos. 6,539,645, 7,441,344, 8,984,763, 9,068,777, 9,243,843, 9,073,711 and 9,550,629.

To allow for transfer of energy from the supplement energy source, the movable product conveyor can be fabricated from a material which is substantially transparent to radiant heat and also able to withstand temperatures of up to 150° C. In some embodiments, the movable product conveyor is fabricated from a material comprising plastic. The term "plastic" means any of various nonmetallic compounds synthetically produced, usually from organic compounds by polymerization, which can be molded into various forms and hardened, or formed into pliable sheets or films. In certain embodiments, the movable product conveyor is fabricated from an acrylic and polyester. Such materials, when used in the fabrication of a movable product conveyor, are known to have the desired thermal radiation transmission properties for use in the present invention. Further, plastic resins can be formed into a uniform, flexible sheet, or into a seamless, endless belt, which can provide additional benefits. In other embodiments, the movable product conveyor is fabricated from stainless steel or other suitable material coated with a non-stick coating such as TEFLON (a polytetrafluoroethylene coating).

The speed, or rate of movement, of the movable product conveyor as well as temperature and rate of air flow can affect the process of drying the printed flavor or fragrance. For example, a relatively slow speed of the movable product conveyor (e.g., ~0.05 m/sec) can increase the amount of heat which is absorbed by the printed flavor or fragrance because the slower speed will cause the printed flavor or fragrance to be exposed to the heat for a longer period of time. Conversely, a relatively fast speed of the movable product conveyor (e.g., ~0.9 m/sec) can decrease the amount of heat which is absorbed by the movable product conveyor because the faster speed will result in less exposure time during which the movable product conveyor is exposed to the heat. Accordingly, the system can include one or more sensors and controllers for regulating the temperature of the heat sources 80, 100; regulating the speed of the movable product conveyor 50; and/or regulating the rate of drying air 46 flowing over printed feed 24. In some embodiments, the movable product conveyor speed is in the range of 0.05 m/sec and 1.0 m/sec.

Dried product 60 exiting the drying component 40 may passively fall off the movable product conveyor 50 and be collected or be actively removed from the movable product conveyor 50 by a product discharge component 110 (FIG. 2), which may optionally be produced from or coated with a non-stick material. Examples of a product discharge component include a doctor blade or scraper blade or other suitable mechanism.

Preferably, the dried product exiting the system is a free-flowing product having a water content of 15% or less. In certain embodiments, the dried product has a water content of 4% to 10%, or more preferably 4% to 8%. In this respect, "dry," "dried," and "substantially dried" encompass those compositions with a water activity of 0.1 to 0.6, or more desirably 0.2 to 0.5, and most preferably from 0.2 to 0.4 wherein said levels of dryness can be achieved with or without secondary drying.

The dried product is "free-flowing" in the sense that the surfaces of the dried particles are virtually free of any flavor or fragrance. In this respect, the dried particles do not agglomerate or clump. In certain embodiments, the dried particles have less than 0.1%, 0.05%, 0.01%, 0.005%, 0.001% or 0.0005% free flavor or fragrance oil on the surface.

In certain embodiments, the dried product is a small granular product or particle, i.e., a dried dot, that can be easily incorporated into foods and other consumer products. Such particles may be of any desired size and preferably have a substantially homogeneous size distribution, i.e., the size of the granules vary by less than ±10%, ±9%, ±8%, ±7%, ±6%, ±5%, ±4%, ±3%, ±2%, or ±1% from the mean diameter of the granules. In one embodiment, the particles have an average diameter ranging from 50 µm to 2000 µm. In another embodiment, the particles have a diameter ranging from 500 µm to 1000 µm. In another embodiment, the particles have an average diameter of greater than 1000 µm.

The dried product thus prepared can be used as a flavoring or flavorant in foods, as dietary supplements, medicaments, cosmetics, fragrances, coloring or thickening materials. For example, a dried flavor product of the invention can be used to flavor soups and soup mixes, casserole dishes, canned and frozen human foods, animal or pet foods, sauces, gravies, stews, simulated meat products, meat spreads and dips, bakery products, replacements for beef, chicken, pork, fish and seafood extracts, and the like. Furthermore, a dried fragrance product of the invention can be used in personal care products including, without limitation, deodorants and antiperspirants, shampoos, hair conditioners, hair rinses, hair refreshers, body washes, soaps products and the like. In particular embodiments, a dried fragrance product of the invention is of use in an aerosol antiperspirant, stick antiperspirant, roll-on antiperspirant, emulsion spray antiperspirant, clear emulsion stick antiperspirant, soft solid antiperspirant, emulsion roll-on antiperspirant, clear emulsion stick antiperspirant, opaque emulsion stick antiperspirant, clear gel antiperspirant, clear stick deodorant or spray deodorant. In addition, a dried fragrance product can be incorporated into fabric care products such as rinse conditioners and liquid and powder detergents; home care products such as all-purpose cleaners and fabric refreshers; personal hygiene products such as hand sanitizers; toiletries; and oral care products such as tooth powder, all of which are known in the art.

This invention also provides a method for printing and drying a flavor or fragrance. The method includes the steps of providing a source of flavor or fragrance, printing the flavor or fragrance directly onto the surface of a movable product conveyor, and conveying the printed flavor or fragrance on the movable product conveyor through or adjacent to a drying component to produce a dried flavor or fragrance product. As described herein, the flavor of fragrance feed can include a solvent and/or carrier and be in the various forms including single raw materials or blends of oils optionally in admixture with a carrier and/or solvent; an encapsulated flavor or fragrance, i.e., a core-shell microcapsule; a food product, e.g., a pureed fruit or vegetable; a reaction flavor, or a combination thereof. In addition, the flavor or fragrance can be printed as a predefined shape in a line or array on the surface of the movable product conveyor and dried under desiccated air at a temperature in the range of 30° C. to 160° C., preferably 30° C. to 110° C., more preferably 40° C. to 100° C., and most preferably 40° C. to 90° C.

The method can further include the step of measuring a characteristic of the product, along with regulating the amount of heat directed toward printed flavor or fragrance. The measured characteristic can include the temperature of the product, the moisture content of the product, and the chemical composition of the product. The characteristic can be detected and measured intermittently at given intervals, or it can be measured continually over a given time interval. Based upon these measurements, the method can also include regulating the temperature of the heat source(s) of the system, regulating the speed of the movable product conveyor and/or regulating the humidity and/or rate of drying air flowing over the printed feed.

The following examples are provided as specific embodiments of the present invention.

Example 1: Printed Tomato Emulsion

A natural flavor-carrier matrix emulsion formulation was prepared (Table 1). Potato protein was dissolved in the water using very low shear on an IKA Werke mixer (at ~100 rpm). The low shear rate was used to not entrain excess air into the system resulting in foam. Once the protein was dissolved in the water, insulins from Blue Agave and Chicory were slowly added in sequence, the shear rate was increased gradually to ~250 rpm and mixing continued until a solution containing no lumps was observed. A solution of Tomato Fresh Natural flavor (in sunflower oil) and rosemary oil was pumped into the vessel containing the potato protein/inulin solution via a Marlow-Watson 504S peristaltic pump at a rate of 12 ml/min and the solution was stirred at a shear rate of ~500 rpm for approximately 10 minutes until the oil was fully incorporated into the aqueous phase to form a coarse emulsion. The beaker with the contents was then placed in a container of ice to decrease the temperature to 15° C. (while being stirred). An overhead high-shear mixer (IKA T25 Ultra-Turrax®) was set at 6,500 rpm and the solution sheared for 2 minutes to form the final emulsion. The resulting emulsion had a viscosity at 15° C. of 3050 cP and a solids content of 60% by weight. The emulsion was removed from the mixer and allowed to equilibrate to room temperature.

TABLE 1

| Description | Weight (g) |
| --- | --- |
| Potato Proteins | 60 |
| Inulin from Blue Agave | 360 |
| Inulin from Chicory Root | 120 |
| Tomato Fresh flavor (2X in sunflower oil) | 59.4 |
| Rosemary Extract | 0.6 |
| Water | 400 |
| Total | 1000 |

To simulate printing of the flavor emulsion, a variable volume micropipette was used to deposit the emulsion onto a sheet of wax paper that was affixed to a metal tray. The diameters of the deposited emulsion droplets varied between 2 mm and 4 mm resulting in droplet volumes of 2.1 mg to 16.8 mg in mass. Once the droplets had been deposited on to the wax paper, as depicted in FIG. 3, the metal tray holding the droplets was placed in a dryer to evaporate the water from the droplets. Heated air was supplied to a small-scale pilot dryer chamber via an inlet and exited via an outlet. The flow rate and temperature of the inlet air are controlled using a control panel attached to a dehumidifier and electrical heating element. The deposited emulsion beads were dried at 40° C. for approximately three hours with an inlet air flow rate of 60 Cubic Feet per Minute. The dried product was scraped off the wax paper and the resulting droplets were determined to be about 2-7 mm$^3$ in volume. Of note, this formulation could not be successfully dried with a spray dryer due to materials sticking to the walls of the dryer, which resulted in a poor product yield. By comparison, the system and method of this invention was successful in providing a dried product from this problematic feed formulation.

Example 2: Printed Flavor Granule

Table 2 compares an exemplary formulation to be spray-dried by conventional methods with a formulation to be printed with the system and method of the invention. While the amount of flavor oil in both formulations is the same, the ratio of starch to maltodextrin of the spray-dry feed and feed to be printed are 2:8 and 3:7, respectively.

TABLE 2

| | Spray-Dry Feed | | Feed to be Printed | |
|---|---|---|---|---|
| Component | Parts | Amount (kg) | Parts | Amount (kg) |
| Water | 550.0 | 1320.0 | 350.0 | 363.7 |
| Starch | 67.5 | 162.0 | 117.0 | 121.6 |
| Maltodextrin | 270.0 | 648.0 | 273.0 | 283.6 |
| Flavor Oil | 112.5 | 270.0 | 260.0 | 270.1 |
| | 1000 | 2400 | 1000 | 1039 |

The characteristics of these formulations as well as the dried products and process conditions are presented in Table 3. Notably, whereas the spray-dried formulation is limited to 45% solids, the printed formulation allows for the amount of solids to be increased to 65%. Further, because the risk of explosion is diminished by printing the flavor feed, the flavor load of the printed formulation can be increased to 40% compared to the 25% flavor load of the spray-dried formulation. Moreover, because printing requires less water to be evaporated, the print process uses less energy per kg of processed flavor oil.

TABLE 3

| Description | Spray-Dried | Printed |
|---|---|---|
| Solids in feed slurry | 45% | 65% |
| Flavor load (d.b.) | 25% | 40% |
| Product moisture | 3% | 5% |
| Yield (d.b.) | 85% | 90% |
| Product produced | 946.4 kg | 639.8 kg |
| Water evaporated | 1287.6 kg | 329.9 kg |
| Production Rate | 153.6 kg/hr | 50.0 kg/hr |
| Evaporation Rate | 209.0 kg/hr | 25.8 kg/hr |

Example 3: Printed Flavor Granules (Natural Matrix)

A natural carrier orange flavor emulsion formulation was prepared (Table 4). In a 1,000 ml glass beaker, Gum Acacia (Nexira) and Maltose (Nagase America Corp.) were dissolved in room temperature water (20-25° C.) using an IKA Eurostar overhead mixer at moderate speed (~800 rpm).

TABLE 4

| Material | Amount (g) | Wet % | Dry % |
|---|---|---|---|
| Tap water | 400 | 40 | 0 |
| Gum Acacia | 180 | 18 | 30 |
| Maltose | 180 | 18 | 30 |
| Orange Valencia Flavor Oil | 240 | 24 | 40 |
| Total | 1000 | 100 | 100 |

The solution was allowed to sit overnight for further hydration and deaeration. The next day, the solution was placed under the IKA Eurostar overhead mixer and mixed at moderate speed (~800 rpm). The flavor oil was slowly added to form a coarse emulsion. This emulsion was then cooled to 15° C. using an ice bath while maintaining agitation. The chilled emulsion was then circulated through an in-line shear mixer (IKA model UTL 25 Inline ULTRA-TURRAX®) and back into the beaker using a Watson-Marlow 504S peristaltic pump. After confirming a circulation flowrate of 180 g/min, the high-shear mixer was turned on and set to 9,000 rpm to emulsify the flavor oil. During the 17-minute shear time, the emulsion in the beaker was continuously agitated and kept in the ice bath. After high-shear mixing, the beaker was removed from the ice bath and any emulsion left in the tubing was drained back into the beaker. Particle size analysis of the orange flavor emulsion confirmed a mean oil droplet size in the range of 2.0-2.5 microns. The viscosity of the emulsion at 22° C. was 1,350 cP (Brookfield DV-III with spindle #4 @ 60 rpm).

The orange flavor emulsion provided in Table 4 was then transferred to a laboratory printing system. This printing system was a purpose-built robotic dispensing system with XYZ motion control. The fluid dispensing head employed a pneumatically actuated jet valve (Nordson Liquidyn P-Dot CT) and the XYZ robot was programmed to dispense an array of individual droplets of fluid onto a coated steel baking tray (Chicago Metallic, half-size bun pan 18"×13").

Approximately 25 ml of the orange flavor emulsion provided in Table 4 was added to the printer feed reservoir. The reservoir was sealed and pressurized to 15 psi with compressed air. The Nordson Jet Valve was configured with a 0.40 mm nozzle cap, the pneumatic actuator set to 33 psi and the force screw set to 1⅜ turns. The robotic dispensing system was then initiated to print a 48×87 array of orange flavor emulsion droplets approximately 1.0 mm in diameter onto the baking tray. After printing, the baking tray was allowed to dry overnight at ambient laboratory conditions (22° C.). The dried granular product was removed from the tray by means of a plastic putty knife. A total of 14 baking trays were printed (14×4176 dots) and dried in order collect approximately 11.5 grams of dried product for characterization. Data from each tray gave an average weight of 0.20 mg per dried dot.

A similar orange flavor emulsion was created so that a comparison could be made to a conventional spray dried flavor. It should be noted that the formula provided in Table 4 could not be spray dried as-is due to the high emulsion viscosity and high maltose content. The maltose content was reduced to prevent glazing in the spray dryer. As a result, the gum acacia level was increased and a higher amount of water used so that the emulsion viscosity was low enough for good atomization in the spray dryer. In addition, the amount of flavor oil for the print dried version was double that of the spray dried formula. It was necessary to limit the amount of flammable oil component in spray dried powders due to dust explosion hazards. The resulting formula for spray drying is provided in Table 5.

TABLE 5

| Material | Amount (g) | Wet % | Dry % |
|---|---|---|---|
| Tap water | 1819.6 | 60.6 | 0 |
| Gum Acacia | 708.2 | 23.6 | 60 |
| Maltose | 236.1 | 7.9 | 20 |
| Orange Valencia Flavor Oil | 236.1 | 7.9 | 20 |
| Total | 3000.0 | 100 | 100 |

In a 5-liter stainless steel beaker, Gum Acacia (Nexira) and Maltose (Nagase America Corp.) were dissolved in hot water (50-55° C.) with moderate agitation (~250 rpm). The solution was then cooled to 21° C. by placing the beaker in an ice bath. Then the orange flavor oil was slowly added to the beaker to form a coarse emulsion. An overhead high-shear mixer (Arde-Barinco, model CJ-4E) was turned on and set to 40% power to emulsify the flavor oil. During the 10-minute shear time, the emulsion was kept cooled with the ice bath. After the high-shear step, a sample of the orange flavor emulsion was analyzed to confirm a mean oil droplet size in the range of 2.0-2.5 microns. The viscosity of the emulsion at 22° C. was 220 cP (Brookfield DV-III with spindle #4 @ 60 rpm).

The orange flavor emulsion provided in Table 5 was then transferred to the spray dryer feed vessel for drying. An Anhydro MicraSpray MS400 pilot-scale spray dryer was used to dry the orange flavor emulsion. This dryer is equipped with a compressed air driven nozzle atomizer (set @ 4 bar) and the dry powder was recovered via a cyclone separator. The inlet air temperature was set to 190° C. and the emulsion feed rate controlled to give an outlet air temperature of 90° C. For this run, the feed rate was 270 g/min for an overall drying time of 11 minutes. There was considerable product build-up within the drying chamber, thereby resulting in yield (42% d.b.) and recovery of only 510 g of dry powder.

A taste panel was conducted to evaluate the print dried granules versus the spray dried powder. The evaluation was done in a tasting solution of 9% sugar, 0.1% citric acid and 0.015% flavor active. Accordingly, the dosage of the print dried granule was 0.038%, while that of the spray dried powder was 0.075%. Overall, the two samples were similar. The print dried sample had slightly more overall flavor intensity, but less fresh and more marmalade notes, whereas the spray dried sample had more aroma and more fresh notes. Table 6 provides the results of flavor retention analysis for the print dried and spray dried samples.

TABLE 6

| Flavor | Spray dried | Print dried |
| --- | --- | --- |
| Total Oil | 19.7 | 36.7 |
| Acetaldehyde | 6.8% | 3.8% |
| Ethyl acetate | 39.9% | 30.8% |
| Methyl butyrate | 69.1% | 73.1% |
| Ethyl butyrate | 83.1% | 85.2% |
| Linalool | 99.8% | 92.6% |
| Limonene | 98.9% | 92.2% |

This example demonstrates the feasibility of producing a dry granular flavor using the printing and drying methods of this invention. Furthermore, the print dried product offers increased flavor loading and reduced process water versus a traditional spray dried product. The particular materials chosen for this example were representative of a shift to natural materials for flavors that are problematic for traditional spray drying. By comparison, the process for print dried flavor granules was better able to handle these formulations.

Example 4: Printed Flavor Granules (Modified Starch Matrix)

An orange flavor emulsion formulation using a modified starch carrier matrix was prepared (Table 7). In a 600 ml glass beaker, modified starch sold under the trademark CAPSUL® (Ingredion) was dissolved in hot water (50-55° C.) using an IKA Eurostar overhead mixer at moderate speed (~800 rpm).

TABLE 7

| Material | Amount (g) | Wet % | Dry % |
| --- | --- | --- | --- |
| Tap water | 120 | 40 | 0 |
| Modified Starch | 90 | 30 | 50 |
| Orange Valencia Flavor Oil | 90 | 30 | 50 |
| Total | 300.0 | 100 | 100 |

The beaker was then placed in an ice bath to cool the solution while maintaining agitation. When the temperature of the solution dropped below 25° C., flavor oil was slowly added to form a coarse emulsion. The emulsion continued to cool to 15° C., then an overhead high-shear mixer (IKA T25 ULTRA-TURRAX®) was used to further emulsify the flavor oil. The IKA T-25 was set to 6,500 rpm and the solution sheared for 2 minutes. After high-shear mixing, the beaker was removed from the ice bath and allowed to warm to room temperature. Particle size analysis of the orange flavor emulsion confirmed a mean oil droplet size in the range of 2.0-2.5 microns. The viscosity of the emulsion at 22° C. was 2,250 cP (Brookfield DV-III @ with spindle #4 @ 60 rpm).

The orange flavor emulsion provided in Table 7 was then transferred to the same laboratory printing system described in Example 3. Approximately 25 ml of the orange flavor emulsion provided in Table 7 was added to the printer feed reservoir. The reservoir was sealed and pressurized to 25 psi with compressed air. The Nordson Jet Valve was configured with a 0.40 mm nozzle cap, the pneumatic actuator set to 35 psi and the force screw set to 1¼ turns. The robotic dispensing system was then initiated to print a 48×87 array of orange flavor emulsion droplets approximately 0.8 mm in diameter onto a coated steel baking tray (Chicago Metallic). After printing, the baking tray was allowed to dry overnight at ambient laboratory conditions (22° C.). The dried granular product was removed from the tray by means of a plastic putty knife. A total of 12 baking trays were printed (14×4176 dots) and dried in order collect approximately 7.6 grams of dried product for characterization. Data from each tray gave an average weight of 0.13 mg per dried dot.

A similar orange flavor emulsion was created so that a comparison could be made to a conventional spray dried flavor. Given that the formula in Table 7 could not be spray dried as-is due to the high emulsion viscosity, a higher amount of water was necessary so that the emulsion viscosity was low enough for good atomization in the spray dryer. In addition, the amount of flavor oil for the print dried version was double that of the spray dried formula. It was necessary to limit the amount of flammable oil component in spray dried powders due to dust explosion hazards. The resulting formula for spray drying is provided in Table 8.

TABLE 8

| Material | Amount (g) | Wet % | Dry % |
| --- | --- | --- | --- |
| Tap water | 1714.2 | 57.1 | 0 |
| Modified Starch | 1028.7 | 34.3 | 80 |
| Orange Valencia Flavor Oil | 247.1 | 8.6 | 20 |
| Total | 3000.0 | 100 | 100 |

In a 5-liter stainless steel beaker, the modified starch sold under the trademark CAPSUL® (Ingredion) was dissolved in hot water (50-55° C.) with moderate agitation (~250 rpm). The solution was then cooled to 21° C. by placing the beaker in an ice bath. Then the orange flavor oil was slowly added to the beaker to form a coarse emulsion. An overhead high-shear mixer (Arde-Barinco, model CJ-4E) was turned on and set to 40% power to emulsify the flavor oil. During the 10-minute shear time, the emulsion was kept cooled with the ice bath. After the high-shear step, a sample of the orange flavor emulsion was analyzed to confirm a mean oil droplet size in the range of 2.0-2.5 microns. The viscosity of the emulsion at 22° C. was 206 cP (Brookfield DV-III @ with spindle #4 @ 60 rpm).

The orange flavor emulsion provided in Table 8 was then transferred to the spray dryer feed vessel for drying. The same pilot-scale spray dryer used in Example 3 was used to dry the orange flavor emulsion. The inlet air temperature was set to 190° C. and the emulsion feed rate controlled to give an outlet air temperature of 90° C. For this run, the feed rate was 200 g/min for an overall drying time of 15 minutes. There was little product hold-up in the dryer and 1,180 g of dry powder was recovered for a 87% yield (d.b.).

A taste panel was conducted to evaluate the print dried granules versus the spray dried powder. The evaluation was done in a tasting solution of 9% sugar, 0.1% citric acid and 0.015% flavor active. Thus, the dosage of the print dried granule was 0.03%, while that of the spray dried powder was 0.075%. Overall, the two samples were similar. While the print dried sample had more intense orange juice notes, the spray dried sample had more intense orange peel notes. Volatile flavor retention analysis was conducted (Table 9), and demonstrated that the print dried sample had better overall retention of the flavor, particularly those with higher boiling points.

TABLE 9

| Flavor | Spray dried | Print dried |
| --- | --- | --- |
| Total Oil | 17.3 | 48.7 |
| Acetaldehyde | 5.6% | 2.1% |
| Ethyl acetate | 27.9% | 24.5% |
| Methyl butyrate | 54.4% | 68.3% |
| Ethyl butyrate | 69.9% | 83.8% |
| Linalool | 90.0% | 97.2% |
| Limonene | 87.2% | 98.1% |

In this example, the modified-starch formulation was well suited for spray drying as indicated by the high process yield. However, the print dried flavor granules using the same carrier system had much higher flavor loading and reduced process water.

Example 5: Printed Flavor Microcapsules

A slurry of flavor microcapsules and other matrix materials was made as per the formula provided in Table 10.

TABLE 10

| Material | Amount (g) | Wet % | Dry % |
| --- | --- | --- | --- |
| Peppermint Flavor Capsules | 391.8 | 65.30 | 29.5 |
| Modified Starch | 20.8 | 3.47 | 7.1 |
| Maltodextrin M150 | 166.6 | 27.76 | 56.3 |
| Maltose | 20.8 | 3.47 | 56.3 |
| Total | 600.0 | 100.00 | 100.0 |

Peppermint flavor microcapsules were added to a 1000 ml glass beaker. These flavor microcapsules were made using a gelatin/silica complex coacervation process (see WO 2017/161364 A1). The flavor microcapsules had a flavor load of 15%, a moisture content of 77.8% and a mean capsule size of 12.6 microns. With moderate agitation (~600 rpm), the modified starch sold under the trademark CAPSUL® (Ingredion), Maltodextrin M150 (Grain Processing Corp.) and Maltose (Nagase America Corp.) were slowly added to the flavor microcapsules in the beaker and mixing continued until all materials appeared to be fully solubilized. The viscosity of the slurry at 22° C. was 160 cP (Brookfield DV-III @ with spindle #4 @ 60 rpm).

The Peppermint flavor microcapsule slurry provided in Table 10 was then transferred to the same laboratory printing system described in Example 3. Approximately 25 ml of the flavor microcapsule slurry was added to the printer feed reservoir. The reservoir was sealed and pressurized to 15 psi with compressed air. The Nordson Jet Valve was configured with a 0.40 mm nozzle cap, the pneumatic actuator set to 33 psi and the force screw set to 1⅝ turns. The robotic dispensing system was then initiated to print a 48×87 array of flavor microcapsule slurry droplets approximately 2 mm in diameter onto a coated steel baking tray (Chicago Metallic). After printing, the baking tray was allowed to dry under ambient laboratory conditions (22° C.) for 150 minutes. The collective weight of the 4,176 granules was 2.34 grams, so each granule weighed 0.56 mg. The dried granular product was removed from the tray by means of a plastic putty knife. This printing and drying procedure was repeated 10 times in order collect approximately 20 grams of dried product for characterization.

For comparison, a spray dry formulation was prepared as provided in Table 11.

TABLE 11

| Material | Amount (g) | Wet % | Dry % |
| --- | --- | --- | --- |
| Peppermint Flavor Capsules | 1959.0 | 65.30 | 29.5 |
| Modified Starch | 104.1 | 3.47 | 7.1 |
| Maltodextrin M150 | 832.8 | 27.76 | 56.3 |
| Maltose | 104.1 | 3.47 | 7.1 |
| Total | 3000.0 | 100.00 | 100.0 |

The same Peppermint flavor capsules used above were added to the 10-liter stainless steel spray drier feed tank. With moderate agitation (~100 rpm), the remaining three ingredient powders were added slowly and mixing continued until all materials appeared to be fully solubilized. The same Anhydro MicraSpray MS400 pilot-scale spray dryer used in Example 3 was used to dry the flavor microcapsule slurry. However, in this case a rotary wheel atomizer was used and operated at 20,000 rpm. The inlet air temperature was set to 190° C. and the emulsion feed rate controlled to give an outlet air temperature of 90° C. For this run, the feed rate was 136 g/min for an overall drying time of 22 minutes. There was a light coating of powder on the spray drier walls indicating moderate product hold-up in the dryer and 955 g of dry powder was recovered.

A taste panel was conducted to evaluate the print dried granules versus the spray dried powder in a gum base. The results in Table 12 show that the print dried sample had slightly better mint flavor intensity both upfront and over the length of the chew.

TABLE 12

| Time | Spray dried | Print dried |
| --- | --- | --- |
| 0:30 seconds | 4.43 | 5.57 |
| 1:00 minute | 5.36 | 5.57 |
| 1:30 minutes | 3.57 | 4.29 |
| 2:00 minutes | 2.57 | 3.11 |
| 2:30 minutes | 2.00 | 2.21 |
| 3:00 minutes | 1.14 | 1.86 |
| 5:00 minutes | 0.86 | 1.36 |
| 10:00 minutes | 0.64 | 0.79 |
| 15:00 minutes | 0.29 | 0.64 |

Intensity rankings were on a scale of 0 to 9 during chewing time, with 9 being most intense.

In addition, volatile flavor retention analysis was conducted (Table 13), and demonstrated that the print dried sample had slightly better overall retention of the peppermint flavor compounds.

TABLE 13

| Flavor | Spray dried | Print dried |
| --- | --- | --- |
| Total Oil | 17.2 | 17.7 |
| Menthone | 81.0% | 82.6% |
| Isomenthone | 81.8% | 88.2% |
| Neomenthol | 79.9% | 78.3% |
| Menthol | 84.4% | 91.7% |
| Pulegone | 82.9% | 86.7% |
| Menthyl acetate | 84.8% | 89.8% |

In this example, the two processes compared favorably to one another. Both methods were able to handle the low viscosity feed formula with flavor microcapsules and produce a dry product with 20% flavor load.

Example 6: Printed Fragrance Granules

A fragrance emulsion formulation using a modified starch carrier matrix was prepared (Table 14).

TABLE 14

| Material | Amount (g) | Wet % | Dry % |
| --- | --- | --- | --- |
| Tap water | 400 | 40 | 0 |
| Modified Starch | 300 | 30 | 50 |
| Popstar Fragrance Oil | 300 | 30 | 50 |
| Total | 1000 | 100 | 100 |

In a 1000 ml glass beaker, modified starch sold under the trademark CAPSUL® (Ingredion) was dissolved in hot water (50-55° C.) using an IKA Eurostar overhead mixer at moderate speed (~600 rpm). The beaker was placed in an ice bath and cooled to room temperature while maintaining agitation. Then fragrance oil was slowly added to form a coarse emulsion. An overhead high-shear mixer (IKA T25 ULTRA-TURRAX®) was used to further emulsify the fragrance oil. The IKA T-25 was set to 9,500 rpm and the solution sheared for 2 minutes. Particle size analysis of the fragrance emulsion confirmed a mean oil droplet size in the range of 2.0-2.5 microns. The viscosity of the emulsion at 22° C. was 1,100 cP (Brookfield DV-III with spindle #4 @ 60 rpm).

The fragrance emulsion provided in Table 14 was then transferred to the same laboratory printing system described in Example 3. Approximately 25 ml of the Popstar fragrance emulsion provided in Table 14 was added to the printer feed reservoir. The reservoir was sealed and pressurized to 15 psi with compressed air. The Nordson Jet Valve was configured with a 0.40 mm nozzle cap, the pneumatic actuator set to 30 psi and the force screw set to 1⅜ turns. The robotic dispensing system was then initiated to print a 48×87 array of Popstar fragrance emulsion droplets approximately 1 mm in diameter onto a coated steel baking tray (Chicago Metallic). After printing, the baking tray was dried overnight at ambient laboratory conditions (22° C.). The dried granular product was removed from the tray by means of a plastic putty knife. A total of six baking trays were printed (6×4176 dots) and dried in order collect approximately 4 grams of dried product for characterization.

A similar fragrance emulsion was created so that a comparison could be made to a conventional spray dried fragrance. Given that the formulation provided in Table 14 could not be spray dried as-is due to the high emulsion viscosity, a somewhat higher amount of water was necessary so that the emulsion viscosity was low enough for good atomization in the spray dryer. Unlike the flavor emulsion examples, however, the amount of fragrance oil for the print dried and spray dried versions were the same, since the lower volatile fragrance oils do not pose the same dust explosion hazards. The resulting formula for spray drying is provided in Table 15.

TABLE 15

| Material | Amount (g) | Wet % | Dry % |
| --- | --- | --- | --- |
| Tap water | 430.0 | 46.50 | 0 |
| Modified Starch | 247.5 | 26.75 | 50 |
| Popstar Fragrance Oil | 247.5 | 26.75 | 50 |
| Total | 925.0 | 100.00 | 100 |

In a 2-liter stainless steel beaker, modified starch sold under the trademark CAPSUL® (Ingredion) was dissolved in hot water (50-55° C.) with moderate agitation (~600 rpm). The beaker was then placed in an ice bath and cooled to room temperature while maintaining agitation. Then fragrance oil was slowly added to form a coarse emulsion and allowed to mix for 10 minutes. Subsequently, an overhead high-shear mixer (IKA T25 ULTRA-TURRAX®) was used to further emulsify the fragrance oil. The IKA T-25 was set to 9,500 rpm and the solution sheared for 2 minutes. Particle size analysis of the fragrance emulsion confirmed a mean oil droplet size in the range of 2-3 microns.

The Popstar fragrance emulsion provided in Table 15 was then transferred to the spray dryer feed vessel for drying. In this example, A Niro Mobile Minor spray dryer was used to dry the fragrance emulsion. This dryer is equipped with a compressed air driven rotary wheel atomizer operating at 25,000 rpm and the dry powder is recovered via a cyclone separator. The inlet air temperature was set to 190° C. and the emulsion feed rate controlled to give an outlet air temperature of 90° C. For this run, the feed rate was 50 g/min for an overall drying time of 19 minutes. There was little product hold-up in the dryer and 420 grams of dry powder was recovered (85% yield).

This example was very similar to Example 3, but for a fragrance application. In this case, the finished dried products were the same, with both having 50% fragrance load. The modified-starch formulation was well-suited for both processes, although the print dried fragrance granules did not require as much process water.

Example 7: Printed Fragrance Microcapsules
(Starch Matrix)

A suspension of fragrance microcapsules in a solution of modified starch and water was prepared (Table 16).

TABLE 16

| Material | Amount (g) | Wet % | Dry % |
| --- | --- | --- | --- |
| Tap water | 181.0 | 30.2 | 0 |
| Modified Starch | 214.5 | 35.7 | 70 |
| Eden PU Microcapsules | 204.5 | 34.1 | 30 |
| Total | 600.0 | 100.0 | 100 |

In a 1,000 ml glass beaker, modified starch sold under the trademark HICAP® 100 (Ingredion) was dissolved in hot water (50-55° C.) using an IKA Eurostar overhead mixer at moderate speed (~800 rpm). The Eden fragrance microcapsules for this experiment were based on polyurea core-shell capsule chemistry where an interfacial polymerization takes place between an isocyanate in the dispersed phase and an amine in the continuous phase. These polyurea microcapsules had a 31% fragrance load, 55% moisture content and a mean capsule size of 10.9 microns. The modified starch solution was cooled to room temperature by placing the beaker in an ice bath while maintaining agitation. Then the Eden polyurea fragrance microcapsules were added and allowed to mix for 10 minutes. The apparent viscosity of the suspension at 22° C. was 1,650 cP (Brookfield DV-III with spindle #4 @ 60 rpm).

The Eden fragrance microcapsule suspension provided in Table 16 was then transferred to the same laboratory printing system described in Example 3. Approximately 25 ml of the Eden fragrance microcapsule suspension was added to the printer feed reservoir. The reservoir was sealed and pressurized to 15 psi with compressed air. The Nordson Jet Valve was configured with a 0.40 mm nozzle cap, the pneumatic actuator set to 33 psi and the force screw set to 1⅜ turns. The robotic dispensing system was then initiated to print a 48×87 array of Eden fragrance microcapsule suspension droplets approximately 1.0 mm in diameter onto a coated steel baking tray (Chicago Metallic). After printing, the baking tray was allowed to dry overnight at ambient laboratory conditions (22° C.). The dried granular product was removed from the tray by means of a plastic putty knife. The collective weight of the 4,176 granules was 0.71 grams, so each granule weighed 0.17 mg. This printing and drying procedure was repeated 10 times in order collect a little more than 7 grams of dried product for characterization.

A similar Eden fragrance microcapsule suspension was created so that a comparison could be made to a spray dried sample. Given that the formula in Table 16 could not be spray dried as-is due to the high suspension viscosity, a higher amount of water was necessary so that the suspension viscosity was low enough for good atomization in the spray dryer. The resulting formula for spray drying is provided in Table 17.

TABLE 17

| Material | Amount (g) | Wet % | Dry % |
| --- | --- | --- | --- |
| Tap water | 196.2 | 37.5 | 0 |
| Modified Starch | 167.3 | 32.0 | 70 |
| Eden PU Microcapsules | 159.5 | 30.5 | 40 |
| Total | 523.0 | 100.0 | 100 |

The same sample of Eden fragrance polyurea microcapsules used in Table 16 was used in this experiment. In a 2-liter stainless steel beaker, modified starch sold under the trademark HICAP® 100 (Ingredion) was dissolved in hot water (50-55° C.) using an IKA Eurostar overhead mixer at moderate speed (~600 rpm). The modified starch solution was cooled to room temperature by placing the beaker in an ice bath while maintaining agitation. Then the Eden polyurea fragrance microcapsules were added and allowed to mix for 10 minutes. Particle size analysis of the feed slurry showed a mean size of ~12 microns, which confirmed that the fragrance microcapsules remained intact.

The Eden fragrance microcapsule suspension provided in Table 17 was then transferred to the spray dryer feed vessel for drying. The same Niro Mobile Minor spray dryer used in Example 6 was used in this experiment. The dryer inlet air temperature was set to 190° C. and the emulsion feed rate controlled to give an outlet air temperature of 90° C. For this run, the feed rate was 50 g/min for an overall drying time of 10 minutes. There was little product hold-up in the dryer and 170 grams of dry powder was recovered (72% yield).

This example was very similar to Example 5, but for a fragrance application. In this case, the finished dried products were the same, with both having 21% fragrance load. The modified-starch formulation was well-suited for both processes, although the print dried fragrance granules did not require as much process water.

Example 8: Printed Fragrance Microcapsules (Salt Matrix)

A mixture of fragrance microcapsules, sodium sulfate and water was prepared as per the formula in Table 18.

TABLE 18

| Material | Amount (g) | Wet % | Dry % |
| --- | --- | --- | --- |
| Eden PU Microcapsules | 76 | 76 | 89.5 |
| Sodium sulfate (salt) | 4 | 4 | 10.5 |
| Tap water | 20 | 20 | 0 |
| Total | 100 | 100 | 100 |

In a 400 ml glass beaker, sodium sulfate ($Na_2SO_4$ CAS #7757-82-6) was added to Eden fragrance microcapsule slurry using an IKA Eurostar overhead mixer at moderate speed (~600 rpm). The same sample of Eden fragrance polyurea microcapsules used in Example 7 was also used in this experiment. These polyurea microcapsules had a fragrance load of 31%, a moisture content of 55% and a mean capsule size of 10.9 microns. The viscosity of the microcapsule/salt mixture at 22° C. was 3,500 cP (Brookfield DV-III with spindle #4 @ 60 rpm).

The Eden fragrance microcapsule/salt mixture provided in Table 18 was then transferred to the same laboratory printing system described in Example 3. Approximately 25 ml of the fragrance microcapsules/salt mixture was added to the printer feed reservoir. The reservoir was sealed and pressurized to 5 psi with compressed air. The Nordson Jet Valve was configured with a 0.40 mm nozzle cap, the pneumatic actuator set to 30 psi and the force screw set to 1½ turns. The robotic dispensing system was then initiated to print a 48×87 array of Eden fragrance microcapsules/salt droplets approximately 1.5 mm in diameter onto a coated steel baking tray (Chicago Metallic). After printing, the baking tray was dried overnight at ambient laboratory conditions (22° C.). The dried granular product was removed from the tray by means of a plastic putty knife. The collective weight of the 4,176 granules was 0.46 grams, so each granule weighed 0.11 mg. This printing and drying procedure was repeated 4 times in order collect about 1.5 grams of dried product for characterization.

A similar Eden fragrance microcapsule/salt mixture was created so that a comparison could be made to a spray dried sample. Given that the formula in Table 18 could not be spray dried as-is due to high viscosity, the formula in Table 19 included additional water to decrease the viscosity for good atomization in the spray dryer.

TABLE 19

| Material | Amount (g) | Wet % | Dry % |
| --- | --- | --- | --- |
| Eden PU Microcapsules | 380 | 54.3 | 89.5 |
| Sodium sulfate (salt) | 20 | 2.9 | 10.5 |
| Tap water | 300 | 42.8 | 0 |
| Total | 700 | 100 | 100 |

The same sample of Eden fragrance polyurea microcapsules used in Table 18 was used in this experiment. In a 2-liter stainless steel beaker, Sodium Sulfate ($Na_2SO_4$ CAS #7757-82-6) and tap water were added to the Eden fragrance microcapsule slurry using an IKA Eurostar overhead mixer at moderate speed (~600 rpm). Particle size analysis of the feed slurry showed a mean size of ~12 microns, which confirmed that the fragrance microcapsules remained intact.

The Eden fragrance microcapsule/salt mixture outlined in Table 19 was then transferred to the spray dryer feed vessel for drying. The same Niro Mobile Minor spray dryer used in Example 6 was used in this experiment. The dryer inlet air temperature was set to 190° C. and the emulsion feed rate controlled to give an outlet air temperature of 90° C. For this run, the feed rate was 50 g/min for an overall drying time of 14 minutes. There was little product hold-up in the dryer and 175 grams of dry powder was recovered (90% yield).

In this example both the print dry and spray dry processes worked well for the fragrance microcapsules with salt formulation. However, the print dry process required significantly less process water. The finished dried products were the same, with both having 21% fragrance load.

Example 9: Printed Natural Chicken Flavor

Meat reaction flavors can be difficult to dry, particularly those with elevated levels of fat. In this example, a chicken reaction flavor was dried with a natural carrier matrix as provided in Table 20.

TABLE 20

| Material | Amount (g) | Wet % | Dry % |
| --- | --- | --- | --- |
| Tap water | 43.50 | 14.50 | 0 |
| Inulin | 29.60 | 9.87 | 14.65 |
| Salt | 49.33 | 16.44 | 24.38 |
| Potato protein | 19.73 | 6.58 | 9.75 |
| Boiled chicken flavor | 157.85 | 52.62 | 51.25 |
| Total | 300.00 | 100.00 | 100.00 |

The boiled chicken reaction flavor (liquid) was produce by a conventional batch thermal process in a pressurized reaction kettle. This reaction flavor had a moisture content of 34.3% and a fat content of 9.8%. To formulate the feed solution for printing, Hot water (50-55° C.) was added to a 600 ml glass beaker. Using an IKA Eurostar overhead mixer at moderate speed (~800 rpm), the three carrier powders (chicory root inulin, fine flake salt and potato protein sold under the trademark SOLANIC® 300) were slowly added until fully dissolved. A laboratory hot plate was used to maintain the solution temperature at 50° C. While mixing, the chicken flavor was added to the carrier solution. An overhead high-shear mixer (IKA T25 ULTRA-TURRAX®) was then used to emulsify the solution at 9,500 rpm for 2 minutes. After shearing the solution was kept warm and agitated until ready for printing. The viscosity of this solution at 22° C. was 8,517 cP (Brookfield DV-III @ with spindle #6 @ 60 rpm).

The chicken flavor mixture provided in Table 20 was then transferred to the same laboratory printing system described in Example 3. Approximately 25 ml of the mixture was added to the printer feed reservoir. The reservoir was sealed and pressurized to 20 psi with compressed air. The Nordson Jet Valve was configured with a 0.40 mm nozzle cap, the pneumatic actuator set to 38 psi and the force screw set to 1½ turns. The robotic dispensing system was then initiated to print a 48×87 array of the flavor mixture approximately 1.1 mm in diameter onto a coated steel baking tray (Chicago Metallic). Four trays were printed in this manner. The baking trays were dried overnight at ambient laboratory conditions (22° C.). The dried granular product was removed from the trays by means of a plastic putty knife. The average weight of each granule of the 4,176×4 printed was 0.22 mg. A total of 3.6 grams of dried product was collected for characterization.

An attempt was made to spray dry the same Chicken Flavor outlined above. However, the feed solution had to be diluted with water in order decrease the viscosity for good atomization in the spray dryer and reduce the fat level. The result formula is provided in Table 21.

TABLE 21

| Material | Amount (g) | Wet % | Dry % |
| --- | --- | --- | --- |
| Tap water | 1200 | 48 | 0 |
| Inulin | 150 | 6 | 14.63 |
| Salt | 250 | 10 | 24.38 |
| Potato protein | 100 | 4 | 9.75 |
| Boiled chicken flavor | 800 | 32 | 51.25 |
| Total | 2500 | 100 | 100.00 |

In a 20-liter stainless steel jacketed reactor (Pope Scientific), the three carrier powders were dissolved in hot water (50-55° C.) with moderate agitation (~250 rpm). The solution was kept warm by circulating hot water through the reactor jacket. While mixing, the chicken flavor was added to the carrier solution. The emulsion was then circulated through a Silverson Verso in-line high-shear mixer by means of a rotary lobe pump (Unibloc-PD). The high-shear mixer was turned on and set to 2,500 rpm to emulsify the chicken flavor. After the 7.5-minute shear time, the circulation pump was shutdown and the reactor bottom valve closed. The solution in the reactor was kept warm and agitated until ready for drying. The viscosity of this solution at 58° C. was 210 cP (Brookfield DV-III @ with spindle #4 @ 60 rpm).

The Chicken Reaction Flavor provided in Table 21 was then transferred to the spray dryer feed vessel for drying. The same pilot-scale spray dryer used in Example 3 was used to dry this chicken flavor. The inlet air temperature was set to 190° C. and the emulsion feed rate controlled to give an outlet air temperature of 90° C. For this run, the feed rate was 167 g/min for an overall drying time of 15 minutes. Unfortunately, this natural chicken flavor formula did not dry well in the spray drier. There was considerable product build-up within the drying chamber, so the poor yield (26% d.b.) resulted in recovery of only 230 g of dry powder.

This example demonstrates how the print dry process handles high viscosity feeds that are not suitable for spray drying. This particular Chicken Reaction Flavor was also very sticky during the drying process, which makes spray drying problematic. The amount of process water needed for spray drying was more than three times that for the print dry process. While the dried product composition was the same for both processes, the poor yield for spray drying makes the print dry process a better choice for these types of dried reaction flavors.

Example 10: Printed Precursor Flavor with Infrared Reaction Drying

In this example, a blend of precursor flavor chemicals (Table 22) was dissolved in water, printed onto a baking tray and then heat treated to promote flavor reactions.

TABLE 22

| Material | Amount (g) | Wet % | Dry % |
|---|---|---|---|
| Tap water | 50.00 | 33.33 | 0 |
| Trisodium Phosphate | 1.50 | 1.00 | 1.50 |
| Chicken Stock Powder | 33.00 | 22.00 | 33.00 |
| Vegetable Broth Flavor Powder | 12.50 | 8.33 | 12.50 |
| Yeast Extract | 10.00 | 6.67 | 10.00 |
| L-Cysteine Hydrochloride Monohydrate | 7.50 | 5.00 | 7.50 |
| L-Proline | 6.25 | 4.17 | 6.25 |
| L-Arginine | 6.25 | 4.17 | 6.25 |
| L-Leucine | 4.00 | 2.67 | 4.00 |
| Dextrose Monohydrate | 15.00 | 10.00 | 15.00 |
| D-xylose | 4.00 | 2.67 | 4.00 |
| Total | 150.00 | 100.00 | 100.00 |

The powdered ingredients listed in Table 22 were added to a 400 ml glass beaker. Then about half of the water was added and mixed by hand using a spatula to wet all the powders. The remaining water was then added, and the entire slurry mixed for 15 minutes using an IKA Eurostar overhead mixer at low speed (~300 rpm). The viscosity of the mixture at 22° C. was 3,000 cP (Brookfield DV-III with spindle #4 @ 60 rpm).

The chicken reaction flavor mixture provided in Table 22 was then transferred to the same laboratory printing system described in Example 3. Approximately 25 ml of the mixture was added to the printer feed reservoir. The reservoir was sealed and pressurized to 10 psi with compressed air. The Nordson Jet Valve was configured with a 0.40 mm nozzle cap, the pneumatic actuator set to 47 psi and the force screw set to 1⅜ turns. The robotic dispensing system was then initiated to print a 48×87 array of the flavor mixture approximately 1.1 mm in diameter onto a coated steel baking tray (Chicago Metallic). Four trays were printed in this manner.

Two of the baking trays were placed in a convention oven (Metro C5 3 series heated holding cabinet) and allowed to dry at 50° C. for 60 minutes. Each of these trays had 4,176 dots that after drying had an average weight of 1.34 grams or 0.32 mg per dot.

The other two trays were dried using an infrared heat lamp (Fostoria, model FFH-512A, 550 watts) for 45 minutes. During this time the surface temperature of the dots on the tray increased to a maximum of 125° C. (center of the dot array) and minimum of 110° C. (at the edges of the dot array). Each of these trays had 4,176 dots that after drying had an average weight of 1.0 grams or 0.24 mg per dot.

A taste panel was conducted to evaluate the print oven-dried sample versus the print IR-dried sample. The evaluation was done in a tasting solution of 0.3% salt and 0.07% dried flavor. The flavor intensity of the printed IR-dried sample was much higher than that of the printed oven-dried sample. The average panelist scores are given in Table 23.

TABLE 23

| Sensory Perception | Oven Dried | IR Dried |
|---|---|---|
| Overall Aroma | 2.0 | 4.2 |
| Overall Flavor | 2.0 | 3.4 |
| White Meat | 1.8 | 2.8 |
| Boiled Egg | 1.8 | 2.5 |
| Roasted | 0.6 | 2.0 |
| Onion & Garlic | 0.8 | 0.7 |
| Salt & Umami | 1.6 | 2.2 |

Intensity rankings were on a scale of 0 to 5, with 5 being most intense.

This example demonstrates the feasibility of not only drying a printed formulation, but also inducing an in-situ flavor reaction using infrared heating. Traditional dried reaction flavors usually require a post-dry milling step that is problematic due to the hygroscopic nature of the product. The print dry/reaction process avoids the need for product milling, since the product is formed as discrete granules during the print step. Overall material handling is greatly simplified by printing flavors in accordance with this invention.

What is claimed is:

1. A method for printing and drying a flavor or fragrance comprising:
    (a) providing a flavor or fragrance feed to a non-contact print assembly which prints the flavor or fragrance feed in individual droplets onto a movable product conveyor that directly receives the droplets of printed flavor or fragrance feed, the droplets having a diameter of greater than 425 micron; and
    (b) drying the printed flavor or fragrance feed on the movable product conveyor as the printed flavor or fragrance feed is conveyed through a drying component to produce a dried product;
    wherein the flavor or fragrance feed comprises a flavor or fragrance, a solvent and a carrier, wherein the solvent comprises water, and
    wherein the printed flavor or fragrance feed is dried at a temperature in the range of 30° C. to 160° C.

2. The method of claim 1, wherein the flavor or fragrance is encapsulated in a core-shell microcapsule.

3. The method of claim 1, wherein the flavor or fragrance feed is printed in an array.

4. The method of claim 1, further comprising
    (c) discharging the dried product from the movable product conveyor.

5. The method of claim 1, wherein the flavor or fragrance feed is printed in a dot pattern.

6. The method of claim 5, wherein the dot pattern is arranged to facilitate drying, post-processing, and product quality.

7. A dried flavor or fragrance produced by the method of claim 1.

8. The dried flavor or fragrance of claim 7, wherein the flavor or fragrance feed has a solid content of at least 50%, and the dried flavor or fragrance has a substantially homogeneous size distribution.

9. A system for printing and drying flavors and fragrances comprising:
    (a) a source of flavor or fragrance providing a flavor or fragrance feed comprising a flavor or fragrance, a solvent and a carrier, wherein the solvent comprises water;

(b) a non-contact print assembly adapted to print the flavor or fragrance feed in individual droplets having a diameter of greater than 425 microns;
(c) a drying component having a drying temperature in the range of 30° C. to 160° C.; and
(d) a movable product conveyor that directly receives the printed flavor or fragrance feed and moves through the drying component to produce a dried product;
wherein the non-contact print assembly is not a spray dryer.

10. The system of claim 9, wherein the flavor or fragrance is encapsulated in a core-shell microcapsule.

11. The system of claim 9, wherein the non-contact print assembly comprises a print head or array of nozzles.

12. The system of claim 9, wherein the movable product conveyor comprises a non-stick belt.

13. The system of claim 9, further comprising a dehumidifier configured to supply desiccated air to the drying component.

14. The system of claim 9, further comprising a supplemental energy source for facilitating drying of the printed flavor or fragrance feed.

15. The system of claim 14, wherein the supplemental energy source is a radiant heat source.

16. The system of claim 9, further comprising
(e) a product discharge component for removing the dried product from the movable product conveyor.

17. The method of claim 1, wherein the flavor or fragrance feed is an emulsion.

18. The method of claim 1, wherein the carrier comprises a carbohydrate.

19. The method of claim 1, wherein the flavor or fragrance feed has a solid content of at least 60%.

20. The method of claim 1, wherein the flavor or fragrance feed has a viscosity of at least 2000 cP.

21. The method of claim 1, wherein the printed flavor or fragrance feed is dried with a radiant heat source.

22. The system of claim 9, wherein the flavor or fragrance feed is an emulsion.

23. The system of claim 9, wherein the carrier comprises a carbohydrate.

24. The system of claim 9, wherein the flavor or fragrance feed has a solid content of at least 60%.

25. The system of claim 9, wherein the flavor or fragrance feed has a viscosity of at least 2000 cP.

26. The system of claim 9, wherein the drying component comprises a radiant heat source.

27. The method of claim 1, wherein the carrier comprises a modified starch.

28. The system of claim 9, wherein the carrier comprises a modified starch.

29. The method of claim 1, wherein the flavor or fragrance feed comprises between 20% and 40% by weight of the flavor or fragrance, and the flavor or fragrance feed has a solid content in the range of 60% to 80%.

30. The system of claim 9, wherein the flavor or fragrance feed comprises between 20% and 40% by weight of the flavor or fragrance, and the flavor or fragrance feed has a solid content in the range of 60% to 80%.

31. The method of claim 1, wherein the non-contact print assembly is at about room temperature.

32. The method of claim 1, wherein the flavor or fragrance feed is at about room temperature.

33. The system of claim 9, wherein the flavor or fragrance feed is at about room temperature.

* * * * *